US010209600B2

(12) United States Patent
Guimard et al.

(10) Patent No.: US 10,209,600 B2
(45) Date of Patent: Feb. 19, 2019

(54) ELECTRICALLY CONDUCTING SUPPORT FOR AN ELECTROCHROMIC DEVICE, ELECTROCHROMIC DEVICE INCORPORATING IT, AND ITS MANUFACTURE

(71) Applicant: SAINT-GOBAIN GLASS FRANCE, Courbevoie (FR)

(72) Inventors: Denis Guimard, Paris (FR); Samuel Dubrenat, Paris (FR); Joao Abreu, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 126 days.

(21) Appl. No.: 15/510,837

(22) PCT Filed: Sep. 10, 2015

(86) PCT No.: PCT/FR2015/052416
§ 371 (c)(1),
(2) Date: Mar. 13, 2017

(87) PCT Pub. No.: WO2016/038311
PCT Pub. Date: Mar. 17, 2016

(65) Prior Publication Data
US 2018/0299738 A1 Oct. 18, 2018

(30) Foreign Application Priority Data
Sep. 11, 2014 (FR) .................................... 14 58559

(51) Int. Cl.
*G02F 1/155* (2006.01)
*G02F 1/1343* (2006.01)
*G02F 1/1333* (2006.01)

(52) U.S. Cl.
CPC .......... *G02F 1/155* (2013.01); *G02F 1/13439* (2013.01); *G02F 1/133345* (2013.01)

(58) Field of Classification Search
CPC ..................................................... G02F 1/155
(Continued)

(56) References Cited

U.S. PATENT DOCUMENTS

2001/0033935 A1 10/2001 Laroche et al.
2008/0092946 A1* 4/2008 Munteanu ............. H01L 31/032
136/252
2015/0009432 A1 1/2015 Katagiri

FOREIGN PATENT DOCUMENTS

WO WO 2008/139934 A1 11/2008
WO WO 2010/050318 A1 5/2010
(Continued)

OTHER PUBLICATIONS

International Search Report as issued in International Patent Application No. PCT/FR2015/052416, dated Dec. 7, 2015.
(Continued)

Primary Examiner — James Jones
(74) Attorney, Agent, or Firm — Pillsbury Winthrop Shaw Pittman LLP

(57) ABSTRACT

An electrically conducting support for an electrochromic device and its manufacture; the electrically conducting support including, in this order: a substrate, an optional underlayer, a first inorganic layer on the optional underlayer or on the substrate, partially or completely structured in thickness with traversing holes or cavities, an electrode, made of metal grid with strands which exhibit, along their length, a rough central region between less rough lateral regions which are flush with the top surface, an electrically conducting coating made of inorganic material.

34 Claims, 7 Drawing Sheets

Figure 1:
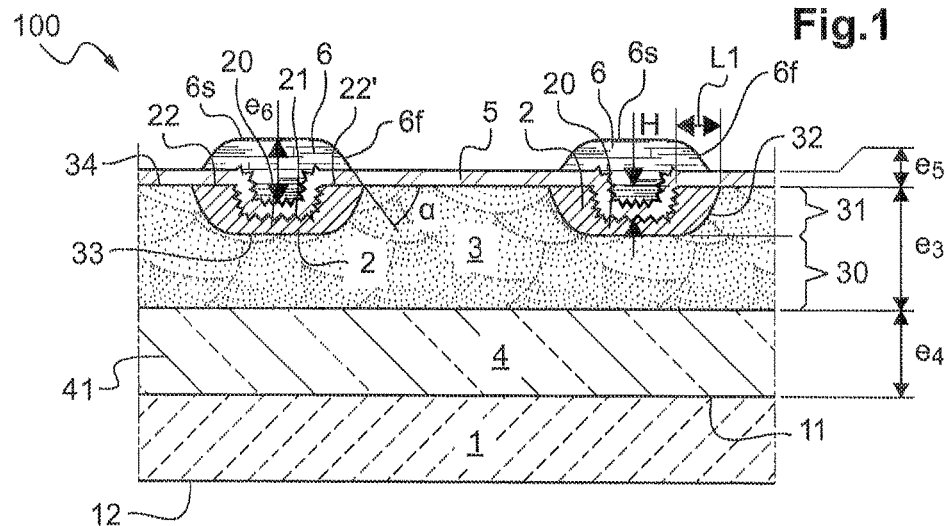

(58) Field of Classification Search
USPC .......................................................... 359/267
See application file for complete search history.

(56) References Cited

FOREIGN PATENT DOCUMENTS

| WO | WO 2011/021470 A1 | 2/2011 |
| WO | WO 2013/140975 A1 | 9/2013 |
| WO | WO 2014/135817 A1 | 9/2014 |

OTHER PUBLICATIONS

Koura, N., "Chapter 17 Electroless Plating of Silver," *Electroless Plating—Fundamentals and Applications*, (1990), William Andrew Publishing/Noyes, pp. 441-462.

\* cited by examiner

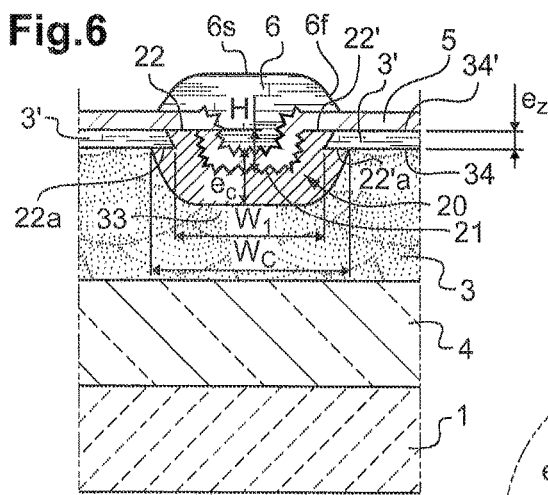
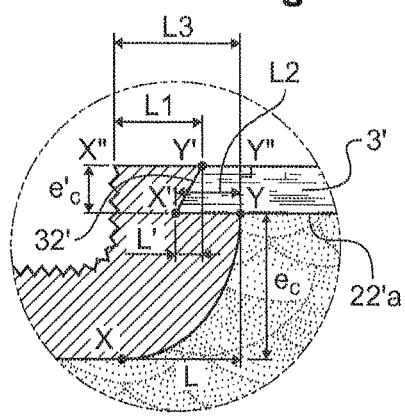
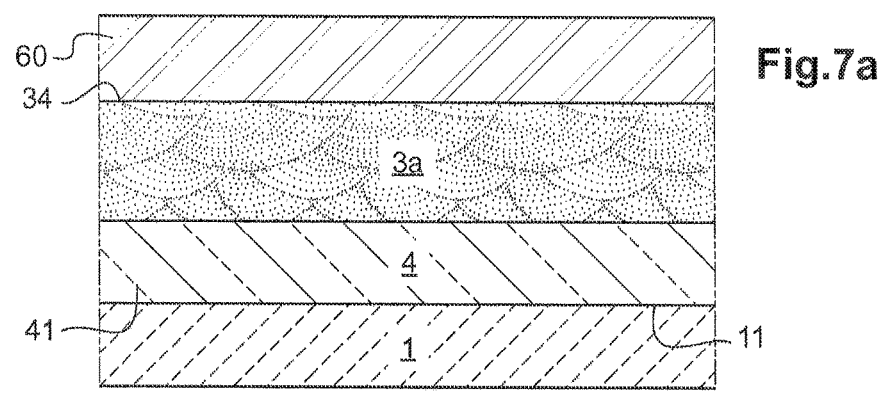

ELECTRICALLY CONDUCTING SUPPORT FOR AN ELECTROCHROMIC DEVICE, ELECTROCHROMIC DEVICE INCORPORATING IT, AND ITS MANUFACTURE

CROSS-REFERENCE TO RELATED APPLICATIONS

This application is the U.S. National Stage of PCT/FR2015/052416, filed Sep. 10, 2015, which in turn claims priority to French patent application number 1458559 filed Sep. 11, 2014. The content of these applications are incorporated herein by reference in their entireties.

A subject matter of the present invention is an electrically conducting support, the electrochromic device incorporating it, and its manufacture.

Conventionally, the lower electrode of an electrochromic glazing is a transparent layer based on indium oxide, generally indium oxide doped with tin, better known under the abbreviation ITO, with a thickness of the order of 100 to 600 nm and with a sheet resistance of greater than 10-15 ohms.

In order to produce large-sized electrochromic modules with a distance between two metal contacts of greater than 1 meter and in order to retain a satisfactory switching time between the colored and colorless states, it is desirable to lower the sheet resistance to values of less than 5 ohms/sq while maintaining a transparency of greater than 70%.

Furthermore, the manufacturing process remains to be simplified and to be rendered reliable on the industrial scale without damaging, indeed even improving, the optical and electrical performances of the electrochromic device.

To this end, the present invention provides an electrically conducting support for an electrochromic device comprising:
  a glass substrate (transparent, optionally translucent, in particular if textured at the surface), made of organic or inorganic glass, with a refractive index $n_1$ within a range extending from 1.45 to 1.8, with a first main face, referred to as first surface,
  an electrode, which comprises a layer arranged as a grid, referred to as metal grid, made of metal material(s) (pure or alloy, preferably monolayer, indeed even multilayer), exhibiting a sheet resistance of less than 10 $\Omega/\square$, better still less than 5 $\Omega/\square$, the metal grid exhibiting a thickness $e_2$ of at least 100 nm and preferably of at most 1500 nm, the metal grid being formed of strands (otherwise referred to as tracks) having a width A of less than or equal to 50 μm and being separated by a distance between strands B of less than or equal to 5000 μm and of at least 50 μm, these strands being separated by a plurality of electrically insulating electrically nonconducting domains having a surface, referred to as top surface, the furthest from the substrate, domains preferably with a refractive index of greater than 1.65.

The electrically conducting support comprises, on the side of the first surface, a first inorganic layer, preferably electrically insulating, of given composition, the first layer being directly on the first surface or on an underlayer, in particular barrier —mono- or multilayer, inorganic—barrier to moisture (if plastic substrate) or to alkali metals (if glass), the first layer being partially or completely structured in thickness with traversing holes or cavities, of width Wc, in order to at least partially anchor the metal grid, the top surface being the surface of the first layer or the surface of an inorganic overlayer, preferably with a thickness of less than or equal to 200 nm.

The strands exhibit, along their length, a central region between lateral (flat) regions which are flush with the top surface and the surface roughness of the central region is greater than the surface roughness of the lateral (smooth) regions, the roughness parameter Rq of the lateral regions preferably being at most 5 nm.

The electrically conducting support additionally comprises an electrically conducting coating made of inorganic substance (mono- or multimaterials) which covers, preferably directly, the top surface, is above the lateral regions and in electrical contact with the lateral regions, and optionally is present above the central regions and in electrical contact with the central regions, with a thickness $e_5$ of less than or equal to 500 nm, better still of less than or equal to 200 nm, with a resistivity $\rho_5$ of less than 20 $\Omega$.cm and greater than the resistivity of the metal grid, and which has a refractive index $n_5$ of at least 1.5, better still at least 1.55 and even of at least 1.7.

In addition, in the central region, the middle of the strand surface and the top surface are separated by a vertical distance H taken at the normal to the first surface and which is less than or equal to 500 nm, better still less than or equal to 300 nm and even less than or equal to 100 nm, when the central region is overflush with the top surface.

The metal grid (its central region) is preferably at least partially anchored in the first layer and is optionally completely anchored in the optional electrically insulating overlayer (monolayer or multilayer) on the first layer. A top surface—surface of the first layer or of the optional overlayer—is chosen which is as smooth as possible, in order to reduce leakage currents.

The top surface (of the first layer or of the overlayer) can preferably exhibit a roughness Rq of less than 10 nm, better still 5 nm and even 2 nm. Rq can be defined according to the standard ISO 4287 and can be measured by atomic force microscopy.

H is limited to 500 nm in underflushness in order to render the profile as low in abruptness as possible. The overflushness is reduced as much as possible in order to anchor the layer and to make possible passivation of the grid side walls by the electrically nonconducting domains.

Preferably, the roughness parameter Rq (of the surface) of the lateral (flat) regions is at most 5 nm and even at most 3 nm and at most 2 nm or also 1 nm, and, preferably, the Rmax (maximum height) in each lateral (flat) region is at most 20 nm and even at most 10 nm.

The roughness of the central region, which is greater than the surface roughness of the lateral regions, is obtained in particular for a deposition of the grid material by the liquid route, such as autocatalytic deposition (by silvering, and the like). The roughness of the central region increases with the thickness of the metal grid (the smooth nature of the lateral regions is independent of the thickness).

The roughness parameter Rq (or rms) in the central region can be at least 10 nm and even at least 20 nm and preferably at most 60 nm, and even the roughness parameter Rmax (maximum height) in the central region can be at least 100 nm and even at least 150 nm and preferably at most 500 nm.

Rmax and Rq of the metal grid can be defined according to the standard ISO 4287 and can be measured by atomic force microscopy.

According to the invention, a lateral region which is flush with the top surface can be strictly on the same plane as the top surface or can deviate therefrom by at most 10 nm and better still by at most 5 nm.

The fact that each lateral (flat) region is flush with the top surface also comes from the deposition by the liquid route of the metal, such as autocatalytic (electroless) deposition based on the reduction of a metal salt in solution, which deposition is carried out through the openings of a masking layer on a layer (partially or completely) structured by wet etching. This phenomenon of rendering flush is independent of the metal thickness.

In particular, in the example of an autocatalytic deposition (such as silvering), the metal, such as silver, is deposited in the holes of a (partially or completely) structured layer (overlayer alone, or overlayer and first layer). The holes are wider than the openings of the masking layer as a result of the lateral etching which occurs during the formation of the structured layer by wet etching. The silver is deposited on the side walls and on the "internal" surface of the masking layer which is located above each hole, internal surface in the plane of the top surface and thus going beyond the side walls of each hole.

The lateral regions flush with the top surface are flat and smooth as a result of their contact with the masking layer, itself with a smooth internal surface. For its part, the internal surface reproduces the smooth and flat nature of the top surface. Wet etching does not generate significant roughnesses on the internal surface and the smooth side walls and cavity bottoms (these potentially generated roughnesses not increasing the roughness of the grid surface, with respect to deposition on the smooth surface).

During physical vapor deposition (PVD), such as magnetron cathode sputtering, by an effect of shade through the openings of a masking layer, such as a (photo)resin, the lateral regions of the strands are dish-shaped, forming a rupture in morphology with a depth equivalent to the height of cavities of the (partially or completely) structured layer capable of generating short circuits when the electrochromic device is subsequently manufactured. In this type of deposition, the strand does not have a smooth lateral region flush with the top surface for an underflush or overflush grid.

In addition, silvering is simple, less complex (no vacuum plants, and the like) than physical vapor deposition PVD and suitable for any size of metal grid. Furthermore, the electrical conductivity of the silver deposited by silvering is sufficient (typically 30% to 40% lower than that of a silver grid produced by PVD).

In a preferred embodiment because it is reliable and the simplest to manufacture, the central region is underflush with the top surface and H is greater than 100 nm, even greater than 150 nm.

During tests, the applicant company found the advantage of a sufficient gap between the surface of the metal grid in the central region and the top surface. This is because, in the case of overflush metal grids, or underflush metal grids with smaller values of H, the applicant company observed the appearance of metal protuberances with a height H1 of the order of 20 nm to 200 nm and with a mid-height width W1 of the order of 20 to 500 nm bordering the internal edges of the lateral regions. These protuberances are continuous or noncontinuous. These protuberances are harmful as they are capable of increasing the leakage currents. The gap H greater than 100 nm, even greater than 150 nm, according to the invention makes it possible to significantly reduce these protuberances and their height, indeed even to suppress them.

According to the invention, when the metal grid is underflush with the top surface, with H greater than 100 nm, indeed even greater than 150 nm, the majority of the metal strands and even each metal strand according to the invention is devoid of these protuberances. According to the invention, the metal strand surface, preferably silver, is regarded as being devoid of protuberances when these protuberances bordering the internal edges of the lateral regions have a height of less than 10 nm.

In another embodiment, H is less than or equal to 100 nm and—even, preferably, the central region is underflush with the top surface—preferably the metal strand surface is devoid of (metal) protuberances with a height greater than 10 nm bordering the internal edges (central region side) of the lateral regions.

With a small gap H, the protuberances are generated during the withdrawal of the masking layer. It is assumed that, when the gap H is small (virtually flush strands), the rupture between the grid metal (the silver) deposited in the hole of the (partially or completely) structured layer and that on the side walls of the masking layer is more problematic to carry out due to a greater region of contact between the grid metal and that on the masking layer. However, these protuberances can be removed by chemical attack.

Advantageously, the electrically conducting support can comprise a noncontinuous layer, referred to as passivation layer, made of an electrically insulating material, forming a grid of insulating tracks located above the central regions and optionally above the lateral regions of the strands, completely covering the central regions and optionally partially or completely covering the lateral regions and not laterally going beyond the external edges of the strands (above the top face) or laterally going beyond the external edges of the strands by at most 1 μm, even by at most 500 nm or also by at most 200 nm (above the top surface), indeed even not going beyond the central regions.

Furthermore, the insulating grid according to the invention can potentially make it possible to limit the leakage currents and thus the deterioration in the lifetime of the electrochromic device. If, furthermore, the surface of the insulating grid is smooth (for example a layer obtained by the sol-gel route or other liquid route method), it can planarize large defects which are a source of leakage currents.

The metal grid exhibits strands of small width A which can even be invisible and is preferably irregular and better still random in order to suppress possible diffraction phenomena. In addition, the passivation layer is located above the strands. Given that the insulating tracks do not extend laterally beyond the metal strands (or only slightly, overshoot of less than 1 μm), the insulating tracks do not bring about a loss of active surface (or only slightly, from the viewpoint of the ratio of the widths of strands to the possible lateral overshoot according to the invention).

The presence of the smoother lateral regions than the central region additionally provides a major advantage of the support according to the invention. The lateral regions do not need to be passivated per se (since they are smooth). The manufacturing process according to the invention makes it possible to localize the insulating tracks partially or completely on the lateral regions and thus to completely cover the rough central regions. Given that the lateral regions are smooth and do not generate leakage currents, the covering thereof, which is optionally only partial, is not troublesome. The possibility of an only partial covering also makes it possible to offer an advantage in terms of manufacturing process, by conferring a tolerance in the choice of the processing parameters.

The bigger they are, the greater the tolerance. The insulating tracks can thus without distinction completely or partially cover the lateral regions, as long as the central regions are completely covered.

The width of the central region can be greater than, equal to or less than that of each lateral region (defined at the level of the top surface). This depends on $e_2$, on H and on the width of the holes receiving the metal grid.

Preferably, the passivation layer has, above the central region, a surface, referred to as upper surface, which exhibits a roughness parameter Rq of less than 10 nm, better still than 5 nm and even than 2 nm and even a roughness parameter Rmax of less than 100 nm, better still than 50 nm and even than 20 nm. In addition, the passivation layer preferably has side walls which exhibit a roughness parameter Rq of less than 10 nm, even than 5 nm and better still than 2 nm and even a roughness parameter Rmax of less than 100 nm, better still than 50 nm and even than 20 nm.

The passivation layer can be monolayer, indeed even multilayer, transparent or opaque (more or less absorbing), and with any refractive index.

The passivation layer can be organic, in particular polymeric.

In a first embodiment of the passivation layer, the electrically insulating material is a positive (annealed) photosensitive material, with a thickness $e_6$ of less than 1000 nm, even of at most 600 nm and even of at most 300 nm, on the electrically conducting coating.

The photosensitive material is conventionally used in photolithography for the masking layers and is denoted photoresist. It is generally a photoresin.

A "positive" photosensitive material is conventionally a type of photosensitive material for which the part exposed to UV light becomes soluble to the developer (development solution) and where the unexposed photosensitive material part remains insoluble.

A "negative" photosensitive material is conventionally a type of photosensitive material for which the part exposed to light becomes insoluble to the developer and where the unexposed photosensitive material part remains soluble.

The passivation layer can be monolayer, indeed even multilayer, transparent or opaque (more or less absorbing), and with any refractive index.

The insulating tracks exhibit oblique side walls brought about by the development of the positive photosensitive material. In particular, the base of the insulating tracks can have an angle α of at most 60°, even between 40 and 50°, with the top surface, such that the insulating tracks are of decreasing width on moving away from the first surface. The cross section of the passivation layer is typically dome-shaped, without sharp angles.

Contrary to all expectations, the positive photosensitive material is compatible with the subsequent stages of manufacture of the electrochromic device.

The planarization material thickness is preferably of the order of magnitude of the Rmax value of the metal grid.

In a preferred implementation of this first embodiment, the passivation layer is a layer based on at least one of the following materials: polyimide, polysiloxane, phenol-formaldehyde (known under the name of novolac resin) or polymethyl methacrylate (PMMA).

In a second embodiment, the passivation layer is inorganic and more particularly a layer of oxide, preferably obtained by the sol-gel route, and/or of nitride of a material which is a metal and/or silicon and preferably a layer of silicon nitride, titanium nitride, titanium oxide, zirconium oxide, silicon oxide, niobium oxide and their mixtures.

The material of the insulating tracks can be deposited by various methods (for example, cathode sputtering or sol-gel). A sol-gel process is favored due to its lower cost and the planarizing nature of the materials by the sol-gel route.

Two configurations are possible for the passivation layer.

In a first configuration, the passivation layer is on the electrically conducting, preferably inorganic, coating.

In a second configuration, the passivation layer is between the electrically conducting, preferably inorganic, coating and the central region (and even the lateral regions).

In one configuration, the electrically conducting coating, preferably an indium-based layer, is noncontinuous and absent from the central regions.

The electrically conducting coating can be noncontinuous and absent from the central regions and H is then defined between the middle of the strand surface and the surface of the electrically conducting coating.

The first layer can be a layer of oxide, preferably obtained by the sol-gel route, and/or of nitride of a material which is a metal and/or silicon and preferably a layer of silicon nitride, titanium nitride, titanium oxide, zirconium oxide, silicon oxide and their mixtures or also of transparent conducting oxide, in particular based on zinc.

The first layer, optionally partially structured according to the invention, can be over a large surface area, for example a surface area of greater than or equal to 0.005 m², indeed even of greater than or equal to 0.5 m² or 1 m². The grid according to the invention can be over a large surface area, for example a surface area of greater than or equal to 0.02 m², indeed even greater than or equal to 0.5 m² or 1 m².

The barrier underlayer to moisture can be added to the substrate and is chosen plastic. The barrier layer can be based on silicon nitride, silicon oxycarbide, silicon oxynitride, silicon oxycarbonitride, or on silica, alumina, titanium oxide, tin oxide, aluminum nitride or titanium nitride, for example with a thickness of less than or equal to 10 nm and preferably of greater than or equal to 3 nm, indeed even 5 nm. It can be a multilayer.

In the present invention, all the refractive indices are defined at 550 nm.

As regards the metal grid, the strands are elongated—unconnected or preferably interconnected (at least in the active region), in particular as a mesh. The insulating tracks have the same architecture.

Preferably, the metal grid is obtained by autocatalytic deposition and preferably by silvering.

Advantageously, the metal grid according to the invention can exhibit a sheet resistance of less than 10 ohms/square, preferably of less than or equal to 5 ohms/square and even 1 ohm/square.

In particular, the obtaining of a low Rsquare makes it possible to increase the conventional size of the electrochromic module and to lower the colored state/colorless state switching time.

The material or materials of the metal grid are chosen from the group formed by silver, copper and nickel, in particular pure material, or can be an alloy based on these metals. The grid is preferably based on silver.

The metal grid can preferably be monolayer (silver), indeed even multilayer (preferably with at least 80%, even 90%, of silver).

The metal grid can be multilayer, in particular silver multilayer, and comprise (indeed even be constituted of), in this order:

a first metal layer (directly on the bottom of the cavities or metal layer closest to the bottom of the cavities), preferably made of a first metal material, which is preferably based on silver, indeed even constituted of silver, forming less than 15% and even 10% of the total thickness $e_2$ of the grid, and/or of at least 3 nm, 5 nm, indeed even of at least 10 nm, and preferably of less than 100 nm, indeed even 50 nm, a second metal layer (on the first layer, moving away from the substrate), in particular with a discernible interface with the first layer, based on a second metal material which is preferably chosen from silver, aluminum or copper, forming at least 70%, 80% and even 90% of the total thickness $e_2$ of the grid, which second layer is preferably based on silver, indeed even constituted of silver, in particular like the first layer.

It is possible in particular to form a first metal layer based on silver according to a first deposition method, for example deposited by silvering, preferably with a thickness of at least 20 nm and even of at least 30 nm, or by vacuum deposition (sputtering), and a second metal layer based on silver with a thickness of at least 3 nm, indeed even 5 nm, according to a second deposition method which is preferably electrodeposition. The advantage of electrodeposition is a greater level of use of sliver than silvering and a less expensive process than sputtering.

The metal grid can be multilayer with layers made of distinct materials, for example with a final layer for protection against corrosion (water and/or air), for example a metal layer, made of a material distinct from the underlying metal layer, in particular distinct from silver, with a thickness of less than 10 nm, better still of less than 5 nm or even 3 nm. This layer is of use in particular for a grid based on silver.

The metal grid can in addition be multilayer with two layers made of distinct materials, for example bilayer, and composed:
- of a (single) metal layer made of the abovementioned materials, preferably based on, indeed even made of, silver, with a thickness of at least 100 nm preferably, for example deposited by silvering or vacuum deposition (sputtering),
- and of an overlayer for protection against corrosion (water and/or air), for example a metal overlayer, made of a material distinct from the metal layer, in particular distinct from silver, with a thickness of less than 10 nm, better still of less than 5 nm or even 3 nm.

The metal grid can be a metal layer, such as silver, and be coated with a protective overlayer, in particular a temporary one, in particular a polymeric one.

The metal grid can be deposited preferably directly on the first partially structured layer chosen, indeed even on a dielectric underlayer, in particular a tie underlayer (having a tie function in order to facilitate the deposition of grid material). The underlayer is directly on the cavities (the bottom and preferably all or part of the side walls of the cavities) of the partially structured layer and is preferably absent from the surface of the partially structured layer, preferably inorganic tie layer, in particular of oxide(s), for example a transparent conducting oxide. The dielectric underlayer has a thickness $e_4$ of less than 30 nm, indeed even 10 nm. This tie layer is easily deposited by magnetron cathode sputtering.

It is preferable, for simplicity, for the metal grid to be directly in contact with a structured layer (no layer between the grid and the bottom of the cavities).

A is chosen to be less than or equal to 50 μm in order to limit the visibility to the naked eye of the strands and $e_2$ is chosen to be at least 100 nm in order to more easily achieve the objective of low Rsquare.

The metal strands are interconnected in the active region of the electrochromic device or are connected (only) via their ends to electrical contacts.

The metal grid can be in the form of strands in the form of closed patterns or meshes (strands interconnected with one another defining closed patterns), of irregular shape and/or of irregular size and better still even random size.

The thickness $e_2$ is not necessarily uniform in a cavity along the width of a strand. Preferably, it is defined at the center of the surface of the strand. The width A is not necessarily uniform in a given cavity. B can be defined as the maximum distance between the strands in particular corresponding to a maximum distance between two points of a mesh.

A and B can vary from one strand to another. As it is possible for the metal grid to be irregular, the dimension A is thus preferably the mean dimension over the strands just as $e_2$ is a mean.

The thickness $e_2$ (defined at the center of the surface of the strand) can be less than 1500 nm, better still than 1000 nm, in particular within a range extending from 100 nm to 1000 nm, or less than 800 nm and in particular within a range extending from 200 nm to 800 nm, in particular from 100 to 500 nm or even 100 to 300 nm, if the structured layer is a sol-gel.

The width A is preferably less than 30 μm in order to again limit the visibility to the naked eye of the strands. A is preferably within a range extending from 1 to 20 μm, more preferably again from 1.5 μm to 20 μm or even from 3 μm to 15 μm. B is at least 50 μm and even at least 200 μm and B is less than 5000 μm, better still less than 2000 μm, even than 1000 μm.

Another characteristic of the metal grid according to the invention is a degree of covering D which is preferably less than 25% and better still than 10%, and even than 6% or than 2%. In addition, preferably, the insulating grid exhibits a degree of covering D' which is less than or equal to D, less than 25% or less than 10%, and even than 6%.

In particular, a B of between 2000 and 5000 μm may be desired when $e_2$ is between 800 and 1500 nm and A is between 10 and 50 μm. This corresponds to a degree of covering of between 0.4 and 6.0%.

In particular, a B of between 200 and 1000 μm may be desired when $e_2$ is less than 500 nm and A is between 3 and 20 μm or 3 and 10 μm. This corresponds to a degree of covering of between 0.5 and 22% or 0.5 and 11%.

For a given Rsquare, a high metal grid thickness $e_2$ is favored at a large width A of strands in order to gain in transparency.

In particular, several embodiments are possible relating to the anchoring of the metal grid in the electrically nonconducting domains.

In a first embodiment, the first layer, which is preferably electrically insulating, and even preferably a sol-gel, is completely structured in thickness with traversing holes of width Wc and, preferably, the optional barrier underlayer is not structured.

In a second embodiment, the first layer, which is preferably electrically insulating, and even preferably a sol-gel, is partially structured in thickness, electrically insulating, by being formed:
- of a region, referred to as bottom region, under the metal grid,
- of a structured region, which region forms electrically nonconducting domains and has cavities—thus obstructed holes—of width Wc; preferably, the lateral regions are contiguous with the first layer and have a width L1, L1 being greater than the height $e_c$ of the cavities and L1≤2$e_c$ and even L1≤1.4$e_c$.

In a third embodiment, there is:

the overlayer (mono- or multilayer), made of electrically insulating material, preferably inorganic material, which is noncontinuous, defining traversing holes, which overlayer forms part of the electrically nonconducting domains, the top surface being the surface of the overlayer, with a thickness $e_z$ of at most 500 nm and even of 300 nm or of at most 100 nm and preferably of at least 20 nm, the first, preferably inorganic, electrically insulating layer, which is:

completely structured in thickness, with traversing holes of width Wc at the interface between the overlayer and the first layer—cavities which receive at least the lower part (of the central region) of the metal grid (the upper part of the central region of the metal grid optionally extending into the traversing openings of the overlayer, indeed even beyond the top surface), or partially structured in thickness, being formed:

of a region, referred to as bottom region, under the metal grid, of a structured region, under the overlayer (and on the bottom region), a region with cavities (thus obstructed openings) of width Wc facing the traversing holes, in particular cavities which receive at least the lower part (of the central region) of the metal grid (the upper part of the central region of the metal grid optionally extending into the traversing openings of the overlayer, indeed even beyond the top surface), the traversing holes, at the interface between the overlayer and the first layer (overlayer-structured region interface), being of width W1 and the cavities being of width Wc, preferably with Wc≥W1, even Wc>W1.

When Wc>W1, regions of strands referred to as edge regions are contiguous with the lateral regions, are more peripheral than the lateral regions and are in cavities under the overlayer—thus flush with the surface of the first layer (the lateral regions forming a projection of the edge regions of thickness $e_,$).

When Wc>W1, the lateral regions are of width L1 defined as the distance between points X" and Y',the edge regions are of width L2 defined as the distance between points X' and Y, Y" is the orthogonal projection of Y into the plane of the surface of the lateral regions and L3 is the distance between X" and Y", L3 being greater than the total height $e_c+e'_c$, and L3≤2($e_c+e'_c$) and even L3≤1.4($e_c+e'_c$), where $e_c$ is the height of the cavities (taken at the middle) and $e'_c$ is the thickness of the overlayer 3'.

Preferably, A is defined at the top surface if W1>Wc and at the surface of the first layer if W1≤Wc. Preferably, B is defined at the top surface if W1>Wc and at the surface of the first layer if W1≤Wc.

When the first layer is partially structured in thickness and the cavities, with a height $e_c$ preferably of greater than 200 nm, are preferably delimited by flared side walls, the cavities widening on moving away from the plastic substrate, it is possible to define a horizontal distance L of greater than $e_c$ and with L≤2 $e_c$. L is between points X and Y such that Y being the topmost point of the side wall and X being the point at the end of the bottom of the cavity.

The holes of the overlayer, of height $e'_c$, can be delimited by flared side walls, widening on moving away from the plastic substrate, with a horizontal distance L' of greater than $e'_c$ and with L'≤2 $e'_c$.

When the first layer is a layer partially structured in thickness, the upper surface of which optionally forms the top surface, the deeper the cavities, the greater the lateral regions.

The overlayer is transparent with an absorption which is as low as possible.

Preferably, the overlayer is inorganic and in particular comprises a layer of a metal and/or silicon oxide, a metal and/or silicon nitride or a metal and/or silicon oxynitride (SiON). Its thickness $e_z$ can be less than 200 nm, than 150 nm, than 100 nm and even from 5 or 20 nm to 80 nm. It can be a monolayer or a multilayer, in particular of metal oxides or of metal oxides and metal nitrides (such as $SiO_2/Si_3N_4$).

The overlayer is, for example, a barrier (protecting) layer for acid etching, for example for aqua regia, which is the normal solution for etching the ITO used for the electrically conducting coating. Preferably, the overlayer comprises at least one layer of an oxide of Ti, Zr, Al and their mixtures, or also Sn, and optionally comprising silicon.

These oxides can be deposited by vapor deposition, in particular magnetron sputtering, or also by the sol-gel route. Preferably, the overlayer has a refractive index of greater than 1.7. In the case of a multilayer, a mean refractive index preferably of greater than 1.7 is defined. In the case of a multilayer, it is preferable for any layer with a refractive index of less than 1.7 to have a thickness of less than 50 nm.

The overlayer has obstructed holes or preferably traversing holes.

The holes can have a height $e'_c$ of greater than 20 nm and even of at least 50 nm or 100 nm and preferably of less than 300 nm and a width $A'_c$ of less than or equal to 30 μm. $e'_c$ is taken at the center of the hole.

The holes can form grooves (unidimensional), regularly or irregularly spaced, in particular unconnected (at least in the active region), of any shape, for example straight or sinuous.

The holes can form a meshwork, that is to say a network of interconnected (two-dimensional) openings, periodical or nonperiodical, of regular or irregular mesh, of any shape: in particular geometrical (square, rectangle, honeycomb). The mesh can be defined by a maximum width between two points of a mesh.

The cavities or traversing holes of the first layer (formed as a grid, defining the arrangement of the metal grid) are preferably partially filled with the metal grid. The cavities are delimited by a bottom and side walls, generally forming a dish.

The cavities or traversing holes of the first layer separating the electrically nonconducting domains can have a height $e_c$ of greater than 200 nm and even of at least 250 nm or 500 nm and preferably of less than 1500 nm or 1200 nm and a width $A_c$ of less than or equal to 30 μm. $e_c$ is taken at the center of the cavity. $A_c$ is preferably taken at the bottom of the cavity.

The cavities or traversing holes of the first layer can form grooves (unidimensional), regularly or irregularly spaced, in particular unconnected (at least in the active region), of any shape, for example straight or sinuous.

The cavities or traversing holes of the first layer can form a meshwork, that is to say a network of interconnected (two-dimensional) openings, periodical or nonperiodical, of regular or irregular mesh, of any shape: in particular geometrical (square, rectangle, honeycomb). The mesh can be defined by a maximum width between two points of a mesh $B_c$.

Preferably, $e_c$ is greater than 200 nm, even greater than 250 nm or than 500 nm. $e_c$ is preferably submicronic. Preferably, $e'_c$ is greater than 100 nm, even greater than 250 nm and less than or equal to 500 nm. $e'_c$ is preferably submicronic.

Within the meaning of the present invention, when it is specified that a deposition of layer or of coating (comprising one or more layers) is carried out directly under or directly on another deposited layer, there cannot be interposition of any layer between these two deposited layers.

In the present invention, all the refractive indices are defined at 550 nm.

The electrically conducting coating has a resistivity $\rho_5$ of less than 20 Ω.cm, even than 10 Ω.cm or than 1 Ω.cm and even than $10^{-1}$ Ω.cm and greater than the resistivity of the metal grid, and has a given refractive index $n_5$ of at least 1.55, better still 1.6 and even better still 1.7.

It is preferable to adjust the resistivity as a function of the distance between the strands. It becomes lower as B increases.

For example, for B=1000 μm and $e_5$=100 nm, a resistivity of less than 0.1 Ω.cm is preferred. For B of 200 μm and $e_5$=100 nm, a resistivity of less than 1 Ω.cm is preferred.

The electrically conducting coating according to the invention contributes to a better distribution of the current.

The electrically conducting coating is preferably monolayer rather than multilayer.

The surface of the coating can reproduce the surface roughness of the grid, in particular obtained by vapor deposition. The coating above the central region can be underflush with the top surface.

The electrically conducting coating can thus comprise (or preferably is constituted of) an inorganic layer with a refractive index $n_a$ of between 1.7 and 2.3, preferably which is the final layer of the coating (the furthest from the substrate) and even the only one, preferably with a thickness of less than 150 nm, based on transparent electrically conducting oxide, simple or mixed oxide:
  in particular based on at least one of the following metal oxides, optionally doped: tin oxide, indium oxide, zinc oxide, molybdenum oxide $MoO_3$, tungsten oxide $WO_3$ or vanadium oxide $V_2O_5$,
  on ITO (preferably), a layer (in particular amorphous), for example based on tin zinc oxide SnZnO, or based on indium zinc oxide (denoted IZO), or based on indium tin zinc oxide (denoted ITZO).

Preferably, a layer based on zinc oxide is doped with aluminum and/or gallium (AZO or GZO).

A layer made of an oxide of zinc, ZnO, is doped, preferably with Al (AZO) and/or Ga (GZO), with the sum of the percentages by weight of Zn+Al or Zn+Ga or Zn+Ga+Al or of Zn+other doping agents preferably chosen from B, Sc or Sb or also from Y, F, V, Si, Ge, Ti, Zr or Hf and even from In which is at least 90% by total weight of metals, better still at least 95% and even at least 97%.

It may be preferable, for an AZO layer according to the invention, for the percentage by weight of aluminum to the sum of the percentages by weight of aluminum and zinc, otherwise referred to as Al/(Al+Zn), to be less than 10%, preferably less than or equal to 5%.

To do this, use may preferably be made of a ceramic target of aluminum oxide and zinc oxide such that the percentage by weight of aluminum oxide to the sum of the percentages by weight of zinc oxide and aluminum oxide, typically $Al_2O_3/(Al_2O_2+ZnO)$, is less than 14%, preferably less than or equal to 7%.

It may be preferable, for a GZO layer according to the invention, for the percentage by weight of gallium to the sum of the percentages by weight of zinc and gallium, otherwise referred to as Ga/(Ga+Zn), to be less than 10% and preferably less than or equal to 5%.

To do this, use may preferably be made of a ceramic target of zinc oxide and gallium oxide such that the percentage by weight of gallium oxide to the sum of the percentages by weight of zinc oxide and gallium oxide, typically $Ga_2O_3/(Ga_2O_3+ZnO)$, is less than 11%, preferably less than or equal to 5%.

In a chosen layer based on tin zinc oxide (SnZnO), the percentage by total weight of metal of Sn preferably varies from 20 to 90% (and preferably from 80 to 10% for Zn) and in particular from 30 to 80% (and preferably from 70 to 20% for Zn); in particular, the ratio by weight Sn/(Sn+Zn) preferably ranges from 20 to 90% and especially from 30 to 80%.

The inorganic layer, preferably ITO or based on zinc oxide, preferably exhibits a thickness of less than or equal to 60 nm, 50 nm, indeed even 40 nm, or even 30 nm and even 10 nm and has a resistivity of less than $10^{-1}$ Ω.cm. Preferably, the choice is made of a layer deposited by physical vapor deposition, in particular by magnetron sputtering, chosen from ITO and ZnO (AZO, GZO, AGZO), indeed even $MoO_3$, $WO_3$ or $V_2O_5$.

Indium tin oxide (or also tin-doped indium oxide or ITO) is preferably understood to mean a mixed oxide or a mixture obtained from oxides of indium(III) ($In_2O_3$) and of tin(IV) ($SnO_2$), preferably in the proportions by weight of between 70 and 95% for the first oxide and 5 to 20% for the second oxide. A typical proportion by weight is approximately 90% by weight of $In_2O_3$ for approximately 10% by weight of $SnO_2$.

The electrically conducting coating can be constituted of the inorganic layer with a refractive index $n_a$ of between 1.7 and 2.3, thus equal to $n_5$.

The electrically conducting coating can be multilayer and comprises (preferably directly), under the abovementioned inorganic layer (in particular final layer), a first layer directly on the metal grid (monolayer or multilayer grid), made of transparent electrically conducting oxide, with a thickness $e'_5$ of less than 200 nm and with an index $n'_5$ of between 1.7 and 2.3, in particular chosen from:
  preferably a layer based on zinc oxide doped in particular with aluminum and/or gallium (AZO or GZO), or optionally ITZO,
  and/or a layer (in particular amorphous), for example based on tin zinc oxide SnZnO, preferably with a thickness of less than 100 nm, or based on indium zinc oxide (denoted IZO), or based on indium tin zinc oxide (denoted ITZO).

The AZO or GZO layer can, for example, make it possible to reduce the thickness of the inorganic layer, in particular of the ITO layer, to less than 50 nm.

In particular, it is possible to have the ITO/A(G)ZO or GZO bilayer or also the (A)GZO or AZO/ITO bilayer.

The substrate can be flat or curved and in addition can be rigid, flexible or semi-flexible.

Its main faces can be rectangular, square or even of any other shape (round, oval, polygonal, and the like). This substrate can be large in size, for example with a surface area of greater than 0.02 $m^2$, indeed even 0.5 $m^2$ or 1 $m^2$, and with a lower electrode substantially occupying the surface (except for the structuring regions).

The substrate made of plastic can be substantially transparent, of polycarbonate PC or polymethyl methacrylate PMMA or also PET, polyvinyl butyral PVB, polyurethane PU, polytetrafluoroethylene PTFE, and the like.

The thickness of the substrate can be at least 0.1 mm, preferably within a range extending from 0.1 to 6 mm, in particular from 0.3 to 3 mm.

The support as defined above can in addition comprise an electrochromic system deposited (preferably directly) on the electrically conducting coating and the passivation layer.

The invention also relates to an electrochromic device incorporating the electrically conducting support as defined above, the electrode with the metal grid forming the "lower" electrode, the closest to the first surface, generally the anode, in particular covered by an electrochromic system, covered by the upper electrode—conventionally a thick ITO layer.

For the upper electrode, in the case of the liquid electrolyte, it is alternatively or cumulatively possible to also use the electrically conducting support as defined above according to the invention.

Finally, the invention relates to a process for the manufacture of an electrically conducting support as defined above which comprises the following stages, in this order:
  the provision of the substrate comprising:
    an optional underlayer (barrier to moisture, and the like) on the first surface,
    a continuous "anchoring" layer, made of the composition of the first layer,
  the formation of cavities or traversing holes in the anchoring layer, thus forming a first layer structured in thickness, the surface of which is the top surface, which formation comprises:
    the preparation, on the anchoring layer, of a noncontinuous masking layer made of photosensitive material (negative or positive) with a given arrangement of traversing openings, with side walls, in particular by:
      deposition of the photosensitive material as an unbroken layer,
      exposure to ultraviolet radiation using a source of ultraviolet radiation on the first surface side,
    the wet etching of the anchoring layer through the traversing openings of the masking layer, creating regions of the masking layer suspended above the cavities or traversing holes and thus defining portions of surfaces, referred to as internal surfaces, of the masking layer facing the cavities or traversing holes, —the width of the openings W0 being less than the width Wc of the cavities or traversing holes at the top surface,
  the formation of the metal grid comprising deposition by the liquid route, preferably autocatalytic deposition, of a first metal material of the grid in the cavities or traversing holes, the first material being deposited on the side walls (of the first delimiting layer) of the cavities and completely on the internal surfaces of the masking layer, thus forming lateral strand regions which are flush with the top surface and less rough than the central strand regions,
  the withdrawal of the masking layer, in particular by the liquid route,
  preferably, the deposition of the electrically conducting coating, which is preferably inorganic, for example by physical vapor deposition,
  optionally the formation of the passivation layer as an insulating grid formed of insulating tracks above the central regions of the strands, passivation layer preferably on the electrically conducting coating present on the central regions.

The etching is carried out by a wet etching process. The depth of the cavities is regulated by the concentration of the solution, the type of solution, the duration of etching and/or the temperature of the solution. The (photo)sensitive masking layer is then resistant to the etching solution.

The etching with a wet solution is vertical and lateral in the sense that the etching solution attacks (hollows out) in all directions. The etching profile can be dish-shaped, of hemispherical type.

The cavities have side walls flared in the opposite direction to the substrate (widening on moving away from the substrate). The cross section can be dish-shaped, even (of) hemispherical (type).

The similar manufacturing process involving a structured overlayer on the first layer, which overlayer has already been described, the surface of which forms the top surface, is described hereinafter.

The invention thus also relates to a process for the manufacture of an electrically conducting support as defined above (with an overlayer on the first layer) which comprises the following stages, in this order:
  the provision of the substrate comprising:
    an optional underlayer (barrier to moisture, and the like) on the first surface,
    a continuous "anchoring" layer, made of the composition of the first layer,
    (directly) on the anchoring layer, a continuous electrically insulating layer, referred to as additional layer, made of material of the overlayer,
  the formation of obstructed or traversing openings in the additional layer, thus forming the overlayer completely or partially structured in thickness, which formation comprising:
    the preparation, on the additional layer, of a noncontinuous masking layer made of photosensitive material (negative or positive) with a given arrangement of traversing openings and with side walls, in particular by
      deposition of the photosensitive material as an unbroken layer,
      exposure to ultraviolet radiation using a source of ultraviolet radiation on the side of the first surface,
    the wet etching of the additional layer, with a first etching solution, through the traversing openings of the masking layer, creating regions of the masking layer suspended above the obstructed or traversing holes and thus defining portions of surfaces, referred to as internal surfaces, of the masking layer facing the obstructed or traversing holes,
  the formation of the cavities or traversing holes in the anchoring layer, thus forming the first partially structured layer with Wc>W1, which formation comprises:
    the wet etching of the anchoring layer with a second etching solution, preferably distinct from the first solution and preferably not etching the overlayer, through the traversing openings of the masking layer and traversing holes of the overlayer, creating regions of the masking layer and of the overlayer suspended above the cavities or traversing holes of the first layer and thus defining portions of surfaces, referred to as other internal surfaces, of the overlayer facing the cavities or traversing holes of the first layer, the formation of the metal grid comprising deposition by the liquid route, preferably autocatalytic deposition, of a first metal material of the grid in the cavities or traversing holes of the first layer and in the traversing holes of the overlayer, thus forming the lateral strand regions which are flush with the top surface under the internal surfaces while being less rough than the central strand regions, the first material being deposited on the side walls of the traversing holes of the overlayer, completely on the other internal surfaces of the overlayer and on the internal surfaces of the masking layer, thus forming the edge regions and the lateral strand regions, the withdrawal of the masking layer, in particular by the liquid route, preferably, the deposition of the electrically conducting coating, which is preferably inorganic, for example by physical vapor deposition, preferably, the formation of the passivation layer as an insulating grid formed of insulating tracks above the central regions of the strands, preferably on the electrically conducting coating present on the central regions.

The depth of the cavities (and/or of the holes of the overlayer) is regulated by the concentration of the solution, the type of solution, the duration of etching and/or the temperature of the solution. The (photo)sensitive masking layer is resistant to the etching solution (to the first and second etching solutions). The cavities (and/or the holes of the overlayer) are flared in the opposite direction to the substrate (widening on moving away from the substrate).

The etching with a wet solution is vertical and lateral in the sense that the etching solution attacks (hollows out) in all directions. The etching profile can be dish-shaped, of hemispherical type. This attack in all directions is the origin of the regions of the masking layer suspended above the cavities or obstructed or traversing holes.

Wc>W1 is preferable as it is thus easier to create peripheral lateral regions flush with the top surface which are smooth.

It is preferable for the electrically conducting coating to be inorganic as the latter withstands better the aqueous chemical solutions used during the stages of chemical development of the layer made of photosensitive material and/or of removal of a portion of the layer made of photosensitive material.

Advantageously, the manufacturing process comprises the formation of the passivation layer as an insulating grid formed of insulating tracks on the central regions of the strands and comprises:
the deposition as an unbroken layer of the positive photosensitive material of the passivation layer covering the electrically conducting coating,
the exposure to ultraviolet radiation using a source of ultraviolet radiation on the side of the second main face,
the development in solution until the layer of the positive photosensitive material has been rendered noncontinuous, the positive photosensitive material remaining located above the metal grid in order to form the passivation layer.

The passivation process includes a stage of photolithography but without recourse to a photolithography mask or to an alignment stage, which would generate an additional cost and complexity. During the UV exposure of the side of the second face, each (opaque) metal strand forms a screen to UV radiation, with the result that the positive photosensitive material above the strand is not exposed and is insoluble in the development solution. The insulating grid is thus self-aligned on the metal grid. Depending on the development, the side walls will be more or less oblique, generally such that the width of the insulating strands decreases with the thickness.

The width of the insulating tracks can be controlled, via the conditions of UV illumination and of development of the layer of the positive photosensitive material, so as to be greater than that of the central strand regions, in order to render more effective the suppression of the leakage currents by being liberated from the edge effects.

The height of the insulating tracks can be controlled via the concentration of the solution of passivation photosensitive material, as well as again the conditions of UV illumination and/or the conditions of development (time and concentration).

The formation of the passivation layer is particularly simple and rapid as there is no need for a stage of deposition of another sacrificial material which has to be completely removed subsequently.

In another implementation, the formation of the passivation layer as an insulating grid formed of insulating tracks on the central regions of the strands comprises:
the deposition as an unbroken layer of the material of the passivation layer covering the electrically conducting coating,
the preparation, on the unbroken layer, of another noncontinuous masking layer made of positive photosensitive material with a given arrangement of traversing openings, by:
deposition of the positive photosensitive material covering the unbroken layer of the material of the passivation layer,
exposure to ultraviolet radiation using a source of ultraviolet radiation on the side of the second main face,
development in solution until the exposed layer of the positive photosensitive material has been rendered noncontinuous, which layer is then located above the strands of the metal grid,
the wet etching of the unbroken layer through the traversing openings of the other masking layer, creating the insulating tracks,
the removal of the other masking layer by the liquid route.

In particular when H is at most 100 nm, the withdrawal of the masking layer (before the deposition of the electrically conducting coating) creates metal protuberances with a height of at least 10 nm bordering the internal edges of the lateral regions of the metal grid and the process comprises, after the withdrawal of the masking layer and before the deposition of the electrically conducting coating, a stage of wet etching in order to eliminate the protuberances.

The deposition by the liquid route of the first metal material is preferably a silvering and the grid is preferably a monolayer.

Advantageously, the deposition by the liquid route (preferably the only deposition for the metal grid) can be a silvering and preferably the grid is a monolayer and even the first material (which is based on silver) is deposited directly in the bottom of the cavities or obstructed holes.

The solution for the silvering stage can comprise a silver salt, a reducing agent for the silver ions and even a chelating agent. The silvering stage can be carried out according to conventional procedures commonly used in the field of the manufacture of mirrors and described, for example, in Chapter 17 of the work "*Electroless Plating—Fundamentals and Applications*", edited by Mallory, Glenn O., and Hajdu, Juan B., (1990), William Andrew Publishing/Noyes.

In a preferred embodiment, the silvering stage comprises (by dipping in a bath or by spraying a solution) bringing the substrate having the optional underlayer, the first layer, the optional overlayer and the masking layer comprising traversing openings into contact with a mixture of two aqueous solutions, one containing the metal salt, for example silver nitrate, and the other containing the reducing agent for the metal ions ($Ag^+$ ions), for example sodium, potassium, aldehydes, alcohols or sugars.

The reducing agents most commonly used are Rochelle salt (potassium sodium tartrate $KNaC_4H_4O_6 \cdot 4H_2O$), glucose, sodium gluconate and formaldehyde.

Preferably, before this contacting operation, the silvering stage comprises a sensitization stage (sensitization of the surface of the cavities and/or holes of the overlayer), preferably comprising treatment with tin salt, and/or an activation stage (activation of the surface of the cavities and/or holes of the overlayer), preferably comprising treatment with a palladium salt. The role of these treatments is essentially to promote the subsequent metallization (by the silver) and to increase the adhesion of the silver metal layer formed (in the cavities and/or holes of the overlayer). For a detailed description of these sensitization and activation stages, reference may be made, for example, to the application US 2001/033935.

More specifically, the silvering can be carried out by dipping the substrate having the optional underlayer, the first layer, the optional overlayer and the masking layer comprising traversing openings, made of (photo)resin, in tanks, each with one of the following three solutions, in this order:
  a first aqueous $SnCl_2$ solution (sensitization), preferably with stirring (preferably for less than 5 minutes, for example 0.5 to 3 min), followed by rinsing with water (distilled),
  a second aqueous $PdCl_2$ solution (activation), preferably with stirring (preferably for less than 5 min, for example 0.5 to 3 min), followed by rinsing with water (distilled),
  a third solution, which is a mixture of the solution of silver salt, preferably of silver nitrate, and of the solution of the reducing agent for the silver, preferably of sodium gluconate, preferably with stirring (preferably for less than 15 min and even than 5 min, for example from 0.5 to 3 min), followed by rinsing with water (distilled).

The coated and thus silvered substrate is subsequently withdrawn from the final bath and rinsed with water (distilled).

Another embodiment consists in spraying the preceding three solutions in the same order as above rather than in dipping the substrate having the optional underlayer, the first layer, the optional overlayer and the masking layer having traversing openings made of (photo)resin.

The withdrawal of the masking layer (before the deposition of the electrically conducting coating) is preferably carried out by the liquid route, in particular by ultrasound in a solvent (acetone, and the like).

The deposition of the electrically conducting coating, directly on the grid and (directly) on the first layer or the optional overlayer, a monolayer or multilayer and/or mono- or multimaterial coating, can be by physical vapor deposition, in particular by cathode sputtering, with an optional first deposition of SnZnO or AZO and a second or final or preferably single deposition of ITO or based on ZnO (doped), indeed even $MoO_3$, $WO_3$ or $V_2O_5$.

The process can comprise, before the deposition of the electrically conducting coating, a stage of heating, preferably between 150° C. and 550° C., for a period of time preferably of between 5 minutes and 120 minutes, in particular between 15 and 90 minutes, and/or a stage of heating after the deposition of the inorganic electrically conducting coating, before or after the deposition of the passivation layer, at a temperature preferably of between 150° C. and 550° C., for a period of time preferably between 5 minutes and 120 minutes, in particular between 15 and 90 minutes.

Figure 1A:
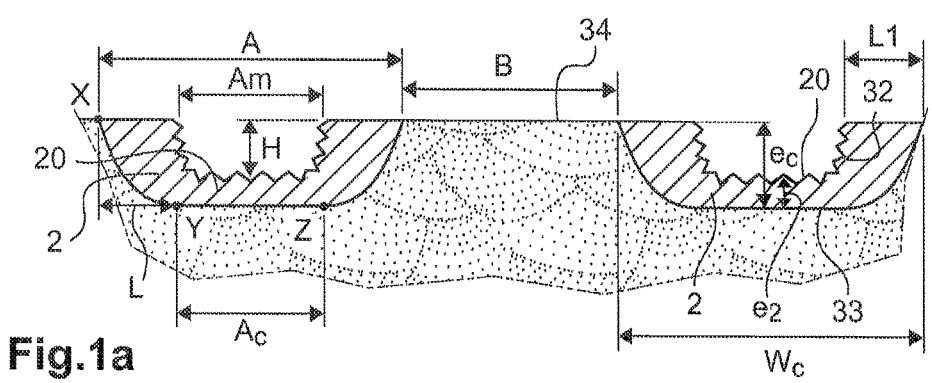
Figure 1B:
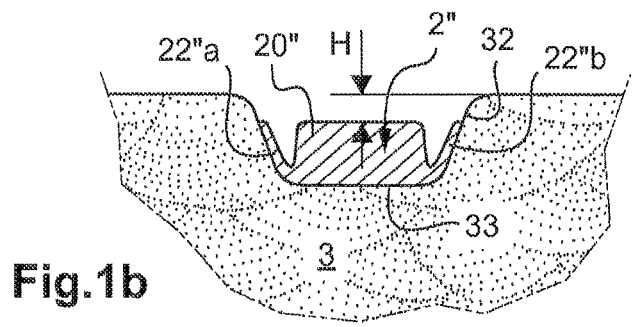
Figure 2:
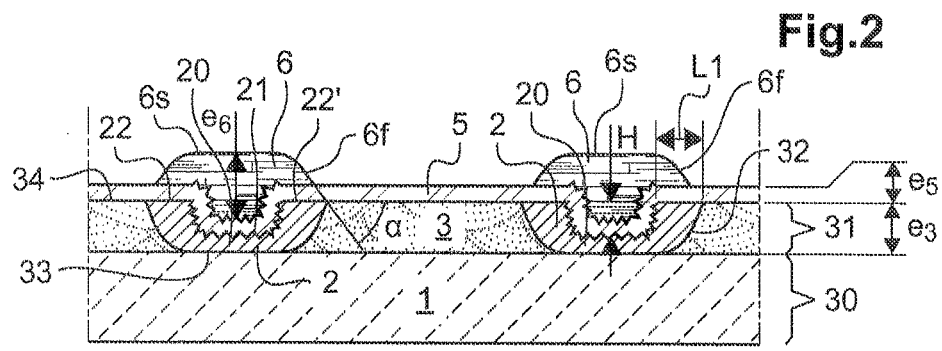
Figure 3:
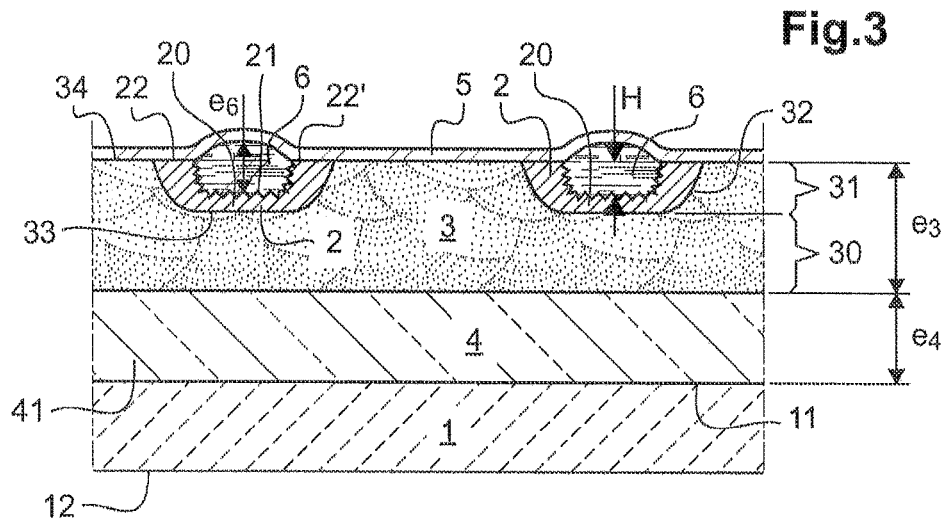
Figure 4:
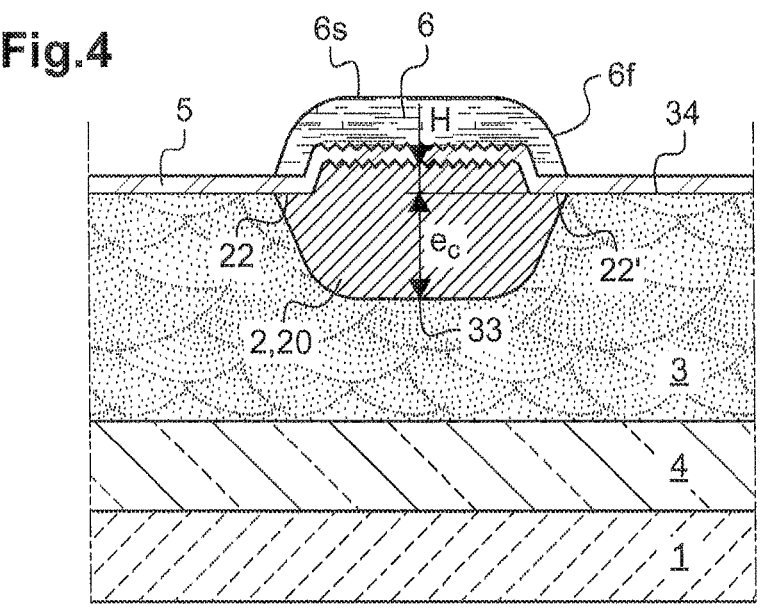
Figure 5:
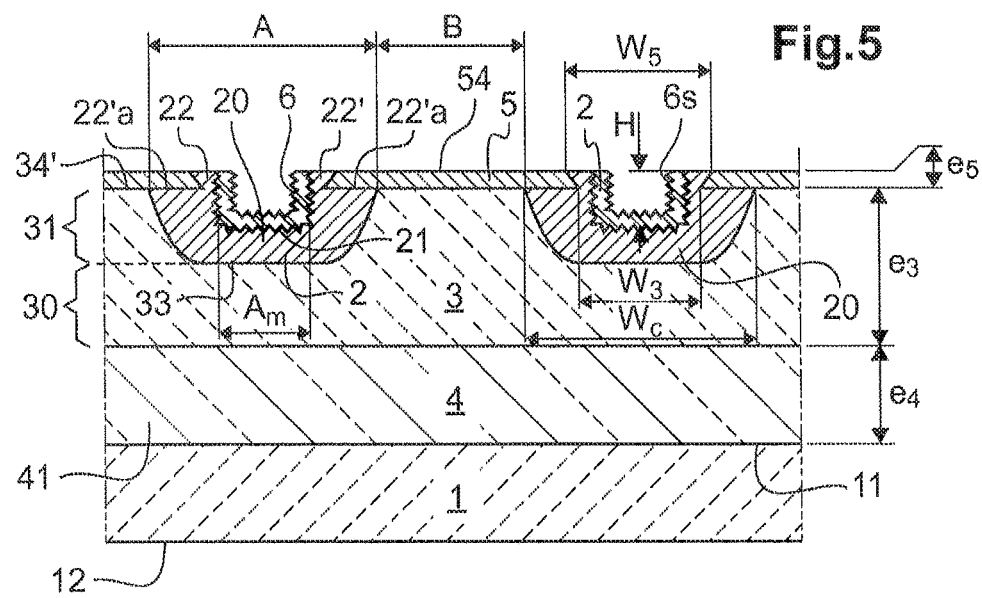

The invention will now be described in more detail using nonlimiting examples and figures:

FIG. 1 is a diagrammatic view in cross section of an electrically conducting support for an electrochromic device according to a first embodiment of the invention in which the central strand region is underflush with the top surface, FIG. 1*a* illustrates a detailed view of FIG. 1 without the passivation layer, FIG. 1*b* illustrates a detailed diagrammatic view of a cross section of a cavity of the first partially structured layer with the strand of a grid deposited by PVD in a comparative example carried out by the applicant company, FIG. 2 is a diagrammatic view in cross section of an electrically conducting support for an electrochromic device according to a second embodiment of the invention in which the first layer 3 is completely structured, FIG. 3 is a diagrammatic view in cross section of an electrically conducting support for an electrochromic device according to a third embodiment of the invention in which the passivation is between the central region and the electrically conducting coating, FIG. 4 is a diagrammatic view in cross section of an electrically conducting support for an electrochromic device according to a fourth embodiment of the invention in which the grid is flush with the top surface, FIG. 5 is a diagrammatic view in cross section of an electrically conducting support for an electrochromic device according to a fifth embodiment of the invention in which the grid is flush with the surface of the electrically conducting coating absent from the central region, FIG. 6 is a diagrammatic view in cross section of an electrically conducting support for an electrochromic device according to a sixth embodiment in which the grid is anchored in a first structured layer and a structured overlayer, FIG. 6' is a detailed view of FIG. 6, FIGS. 7*a* to 7*i* are diagrammatic views of the stages of the process for the manufacture of the electrically conducting support in connection with the first embodiment.

It is specified that, for the sake of clarity, the various elements of the objects represented are not reproduced to scale.

FIG. 1, which is diagrammatic, represents, in lateral cross section, an electrically conducting support 100 for an electrochromic device.

This support 100 comprises a smooth glass substrate with a refractive index $n_s$ of 1.45 to 1.8 with a first main face 11, referred to as first surface, carrying, in this order, moving away from the substrate:
  an optional barrier layer to moisture 4, such as silicon nitride 41 or a stack of thin layers,
  a first layer partially structured in thickness 3, which is inorganic, preferably an electrically insulating material, of preferably micronic or submicronic thickness $e_3$, comprising:

a (continuous) region, referred to as bottom region, 30, which is here directly on the underlayer, of given (preferably micronic) thickness $e'_3$, covering the surface of the underlayer, a structured region 31, in relief or hollowed out, the reliefs defining a flat top surface 34, the cavities or hollows being delimited by a bottom 33 (defining a bottom surface) and side walls 32, cavity of width Wc at the top surface 34 and of height $e_c$ taken at the middle, preferably of at most 1500 nm and preferably greater than 100 nm, the cavities spreading out according to a given arrangement (unconnected strips, a meshing, and the like) which is regular or irregular, the top surface being locally flat, an electrode 2, comprising a layer arranged as a grid 2, referred to as metal grid, made of metal material(s) obtained by autocatalytic deposition, preferably a silver monolayer (obtained by silvering), the grid being in this instance a monolayer formed of strands—otherwise referred to as tracks—20 anchored in the cavities, the strands having a width A of less than 50 µm at the top surface 34, better still less than or equal to 30 µm, (and of at least 1 µm) and being separated at the top surface 34 by a distance B of less than or equal to 5000 µm and at least 50 µm, grid with a thickness $e_2$ defined at the middle of the strand of at least 100 nm and preferably of less than 1500 nm, the metal grid exhibiting a sheet resistance of less than 10 Ω/□ and even of less than 5 Ω/□ or than 1 Ω/□, an inorganic electrically conducting coating 5, preferably a monolayer, with a thickness $e_5$ of less than or equal to 500 nm or 100 nm and better still of less than or equal to 60 nm, with a resistivity $\rho_5$ of less than 20 Ω.cm and greater than the resistivity of the metal grid, and with a given refractive index $n_5$ of at least 1.5 and better still 1.7, in this instance constituted of an inorganic layer which is made of ITO (or of AZO or GZO, AGZO) on the grid 2 and the top surface 34, a passivation layer 6 directly on the electrically conducting coating 5, which layer is noncontinuous, preferably, made of positive photoresin, with a thickness $e_6$ (taken at the middle of the cavity) of less than 1000 nm.

The cavities have flared side walls as a result of the process for the wet etching of a continuous layer during the formation of the first partially structured layer described in detail below.

The strands 20 exhibit, along their length, a central region 21 between lateral regions 22, 22' which are flush with the top surface 34 and the surface roughness of the central region 21 is greater than the surface roughness of the lateral regions 22, 22'.

In order to characterize the metal grid 2, as shown in FIG. 1a (detailed view of FIG. 1 without the passivation layer), A, B, $e_2$, and also the width of the central region $A_m$ and, for the cavities, the width $A_c$ at the bottom of the cavity and the height $e_c$ starting from the center of the bottom of the cavity are represented.

The side walls are flared (widening on moving away from the substrate 1) and a horizontal distance L between X and Y, such that X being the highest point of the side wall and Y being the point at the end of the bottom of the cavity, is defined. L is greater than $e_c$, L≤2 $e_c$, and even L≤1.4 $e_c$.

In the central region 21, the middle of the strand surface and the top surface are distant by a vertical distance H taken at the normal to the first surface and which is less than or equal to 500 nm. In this instance, the central region 21 is underflush with the top surface 34.

The strands exhibit a central region 21 which is rougher than the lateral regions as a result of the autocatalytic deposition, such as silvering, and smooth lateral regions 22, 22' of width L1. The width of the central region $A_m$ is not necessarily greater than L1; this depends on the values of A, H and $e_c$.

Examples of roughness parameters of the central regions and of the flat lateral regions are recorded in the following table as a function of thickness $e_2$.

| Surface of the strand | $e_2$ (nm) | Rq (nm) | Rmax (nm) |
|---|---|---|---|
| Lateral regions | 300 | 2 | 10 |
| Central region | 300 | 30 | 300 |
| Lateral regions | 200 | 1.5 | 8 |
| Central region | 200 | 20 | 200 |
| Lateral regions | 450 | 2 | 10 |
| Central region | 450 | 35 | 450 |

The ITO coating 5 is preferably deposited by magnetron cathode sputtering; its surface then conforms to the underlying surface: surface of the first partially structured layer 3, of the flat and smooth lateral regions 22, 22' and of the central regions 21 which are rougher than the lateral regions.

The passivation layer 6 forms a grid of localized insulating tracks above the central regions 21 and above the lateral regions 22, 22' of the strands, covering the central regions and partially or completely covering the lateral regions and laterally not exceeding exterior edges of the strands or laterally exceeding exterior edges of the strands by at most 1 µm. In this instance, the side walls 6f of each insulating track are oblique with an angle a with the top surface 34 of the order of 45°. The cross section of each insulating track is dome shaped, without a sharp angle. As the upper surface 6s of each insulating track and the side walls 6f of each insulating track are smooth, the passivation layer 6 planarizes the central region 21 and retains the smooth nature of the lateral regions 22, 22'.

In order to subsequently manufacture an electrochromic device, an electrochromic system, an upper electrode which can be identical in the case of a liquid electrolyte, is added.

The metal grid preferably has a random pattern.

In an example No. 1 in connection with the first embodiment (of FIG. 1), the characteristics below are chosen.

The glass substrate 1 is flat and smooth, with a refractive index of 1.5, for example with a thickness of 2 mm and with a $T_L$ of at least 90%.

The barrier layer is a stack of thin layers of metal or silicon oxides or nitrides.

The first layer is a $TiO_x$ sol-gel layer with a thickness of 400 nm. This layer can alternatively be deposited by cathode sputtering.

The thickness $e_c$ is 350 nm. The cavities of the first layer 3 are obtained by etching, as described in detail subsequently.

The first partially structured layer 3 is locally flat. The roughness of the top surface 34 is defined by an Rq of less than 4 nm.

The grid 2 is a silver monolayer deposited directly in the cavities by silvering, as described in detail subsequently. The silver in this instance partially fills the cavities, with $e_2$ equal to approximately 300 nm. H is thus equal to 50 nm. The pattern of the grid, which is a meshing, is hexagonal. The width A is equal to 12 µm and the maximum distance B to 560 µm. The degree of coverage T is 4.5%.

The electrically conducting coating 5 is constituted of a layer of indium tin oxide ITO of 50 nm, with a refractive index of approximately 2 and with a resistivity $\rho_5$ of less than $10^{-1}$ Ω.cm.

The Rsquare of the assembly (after annealing at 150° C. for 30 min), measured by the conventional 4-point method, is 2.5 ohms/square approximately.

The passivation layer forming the localized insulating grid is for its part a positive photosensitive polyimide layer with $e_6$ of the order of 300 nm.

Subsequently, an electrochromic system with an upper electrode made of ITO with a thickness of 400 nm is added.

FIGS. 7a to 7i are diagrammatic views (not to scale) of the manufacture of the electrically conducting support according to the first embodiment, in particular in connection with example No. 1, with manufacture of the first partially structured layer by chemical etching and manufacture of the silver grid by silvering.

The first stage, illustrated in FIG. 7a, consists, starting from the glass substrate 1 coated with the underlayer:
in forming, on the underlayer, an anchoring layer 3a which comprises the material of the first layer,
in applying, to the layer 3a, by spin coating, a layer 60 of a masking material in the liquid state, a positive photosensitive material, resin AZ®1505.

The deposited photosensitive material is subsequently baked at 100° C. for 20 min in a convective oven. The thickness of the photosensitive material is 800 nm.

Figure 7B:
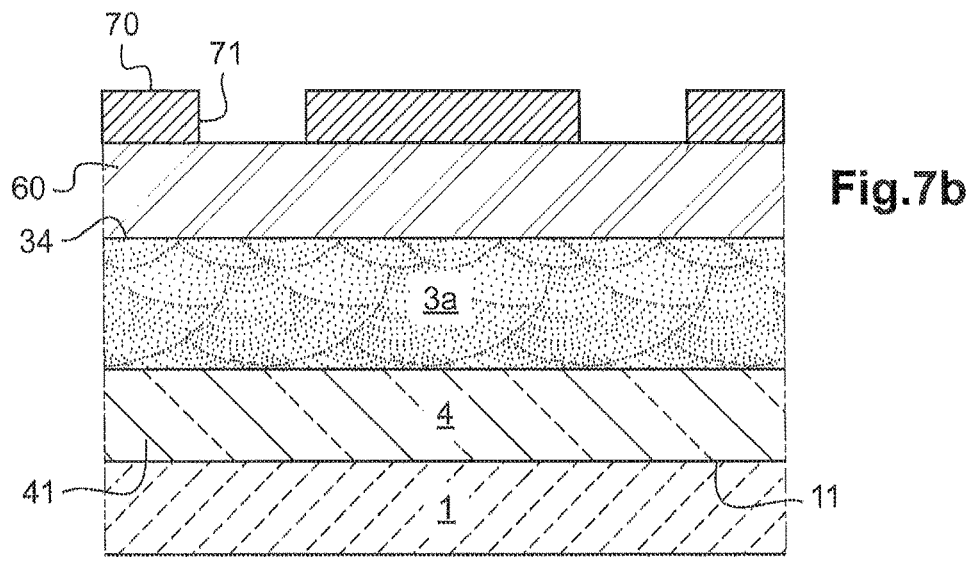

The second stage, illustrated in FIG. 7b, consists of the generation of the photoresin pattern. In order to do this, a photolithography mask 70 with discontinuities 71 is applied to the resin 60, and the resin 60 is irradiated with UV radiation, on the side of the first main face 11, with a 20 mW/cm² (at 365 nm) mercury lamp for 10 seconds through the discontinuities 71, according to an irregular, better still random, arrangement.

Figure 7C:
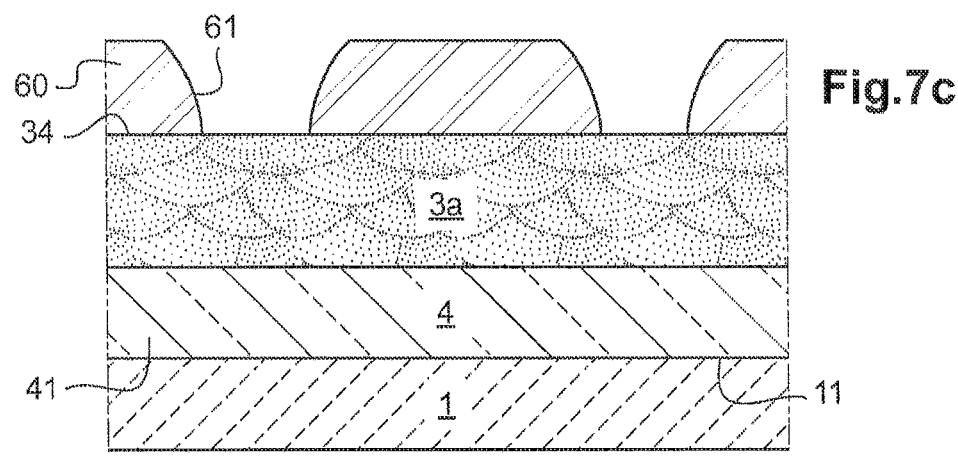

The third stage, illustrated in FIG. 7c, consists of the creation of the traversing openings in the photosensitive material 60. The irradiated regions are eliminated by dissolution in a specific development solution based on tetramethylammonium hydroxide (TMAH) and rinsed with deionized water, thus forming traversing openings through the photoresin. The side walls 61 of the photosensitive material delimiting the traversing openings are flared on moving away from the substrate. Thus, at the external or upper surface 63 of the photosensitive material 60, the width of each traversing opening is greater than the width W0 at the top surface 34.

Alternatively, use may be made of a negative photosensitive material and a reverse photoetching mask (withdrawal of the non-irradiated regions in order to form the openings).

Figure 7D:
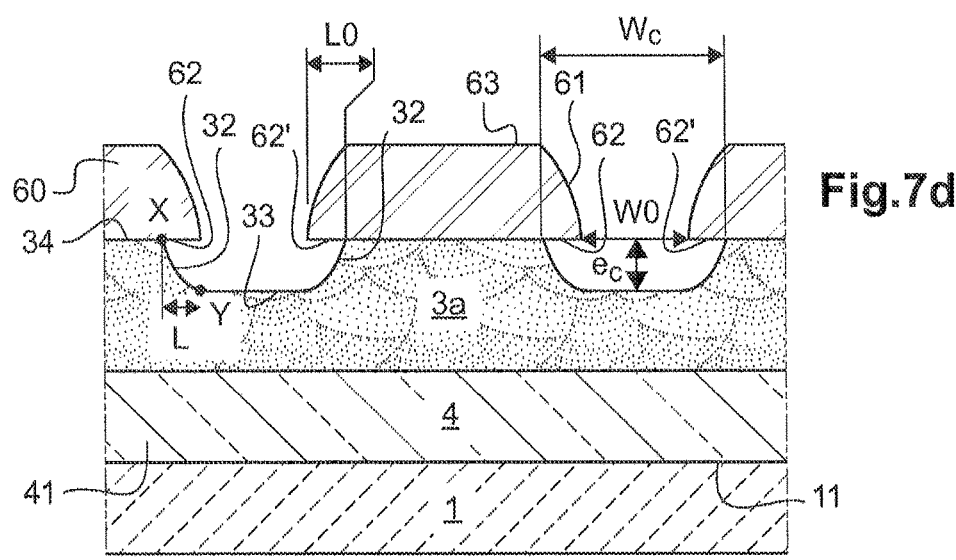

The fourth stage, illustrated in FIG. 7d, consists of the creation of the cavities in the continuous anchoring layer 3a, which is preferably dielectric, such as the $TiO_x$ layer. It is preferable to form the first partially structured layer by wet etching rather than dry etching, at ambient temperature. The resin 60 chosen is thus resistant to the etching solution, which is in this instance a solution based on $NH_3$ and $H_2O_2$. The etching forms cavities of depth $e_c$, side walls 32 and the cavities are flared on moving away from the glass 1. For example No. 1, $e_c$ is equal to 350 nm.

The etching solution attacks (hollows out) in all directions: vertically and laterally.

The etching profile is dish-shaped. The wet etching of the anchoring layer 3a creates regions of the masking layer suspended above the cavities and thus defining portions of surfaces, referred to as internal surfaces, 62, 62' of the masking layer 60 facing the cavities 32. Each cavity is of width Wc (at the top surface) greater than the width W0. The internal surfaces 62, 62' are of width L0 substantially equal to L. The bottom 33 of the cavities is flat.

Figure 7E:
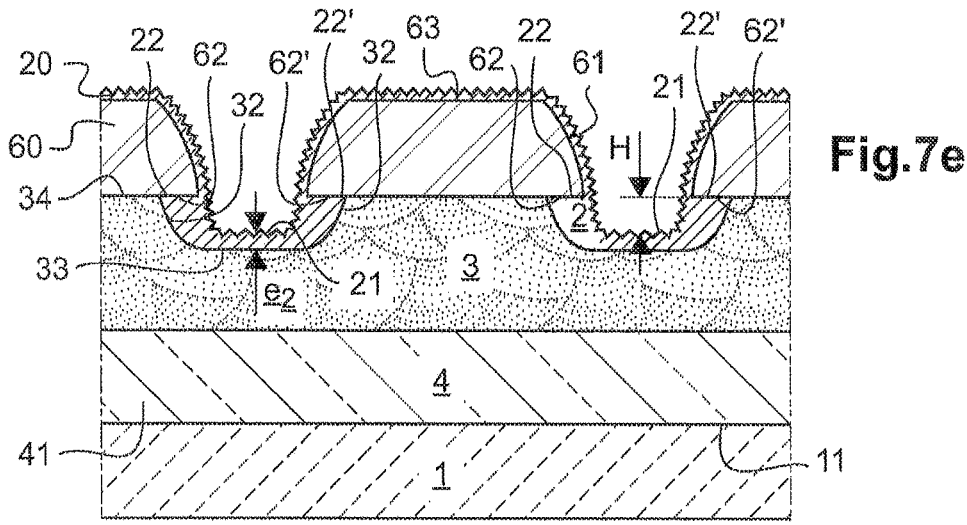

The fifth stage, illustrated in FIG. 7e, consists of the deposition of the grid material 2 by the liquid route and more specifically autocatalytic deposition, thus preferably by silvering. The deposition is carried out through the openings of the photosensitive material 60 (resistant to etching) in the cavities, in order to preferably partially fill them, as illustrated here.

The silver is deposited in the bottom of the cavities, on the side walls of the cavities, on the internal surfaces 62, 62' of the photosensitive material, on the side walls of the photosensitive material (and is absent from the top surface of the layer 3) and on the noncontinuous upper surface 63.

More specifically, the silvering partially fills each cavity and is deposited in the bottom, on the side walls and entirely on the internal surfaces 62, 62' of the masking layer, thus forming lateral strand regions 22, 22' which are flush with the top surface and less rough than the central strand region 21 facing the traversing opening. The width L1 of each lateral region 22, 22' is approximately equal to $L0+e_2$.

For example No. 1, the silver layer is deposited in the first partially structured layer 3 according to the following procedure for a thickness $e_2$, approximately 300 nm (with H equal to 50 nm and the central region an underflush one);
diluting the silvering solutions (dilutable solutions provided by Dr. Ing. Schmitt, GMBH, Dieselstr. 16, 64807 Dieburg/Germany) according to:
100 μl of Miraflex®1200 ($SnCl_2$ solution) in a 250 cm³ phial (sol. No. 1),
200 μl of Miraflex® PD ($PdCl_2$ solution) in a 250 cm³ phial (sol. No. 2),
15 ml of Miraflex® RV (solution of reducing agent, sodium gluconate) in a 250 cm³ phial (sol. No. 3),
15 ml of Miraflex®S (silver nitrate solution) in a 250 cm³ phial (sol. No. 4);
the abovementioned solutions are used at ambient temperature,
placing the substrate (with layers 4, 3) in a tank into which the contents of solution No. 1 are poured, stirring for 1 min and then rinsing with distilled water;
placing the substrate (with layers 4, 3) in a second tank into which the contents of solution No. 2 are poured, stirring for 1 min and then rinsing with distilled water;
placing the substrate (with layers 4, 3) in a final tank into which the contents of solutions Nos 3 and 4 are poured, stirring for 2 minutes and then rising with distilled water.

Figure 7F:
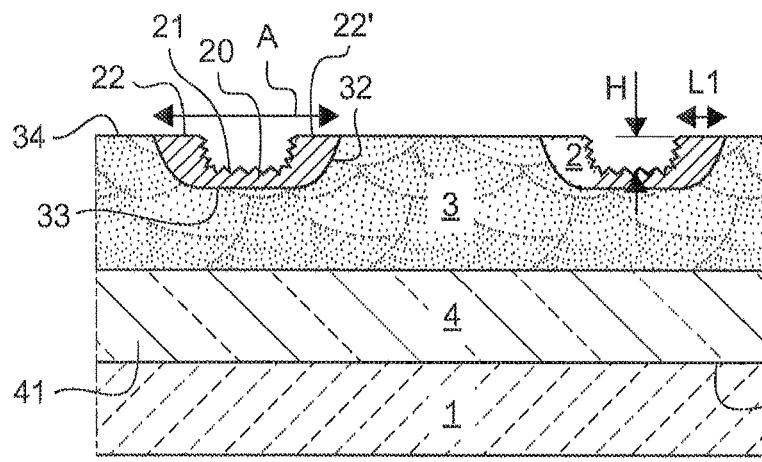

The sixth stage, illustrated in FIG. 7f, consists of the withdrawal of the photosensitive material by the liquid route with an acetone solvent and use of ultrasound.

The electrically conducting support is subsequently preferably immersed in a $H_2O:H_2O_2:NH_3$ (500:20:1) solution for 3 to 5 min at ambient temperature in order to eliminate silver protuberances. This chemical treatment is particularly recommended in the case of an underflush grid with H less than 100 nm or when the grid is an overflush one.

Figure 7G:
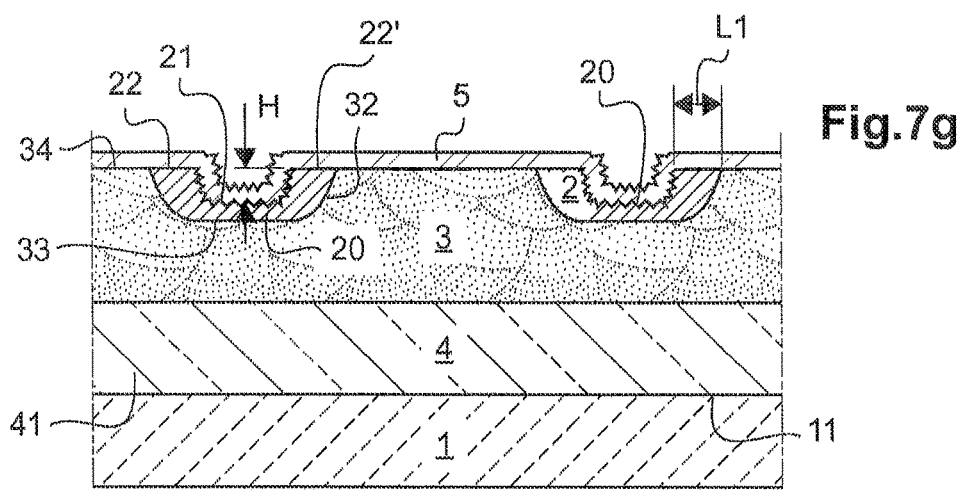

The seventh stage, illustrated in FIG. 7g, consists of the deposition by cathode sputtering of the electrically conducting coating 5. For example No. 1, it is a layer of indium tin oxide ITO. The ITO is deposited by magnetron cathode sputtering under a mixture of argon and oxygen, 1% $O_2$/($Ar+O_2$), at a pressure of 2×10 mbar with a ceramic target made of indium oxide (90% by weight) and tin oxide (10% by weight).

In an alternative form, AZO, GZO or AGZO is chosen.

A first annealing is subsequently carried out at 250° C. for 30 min.

Figure 7I:
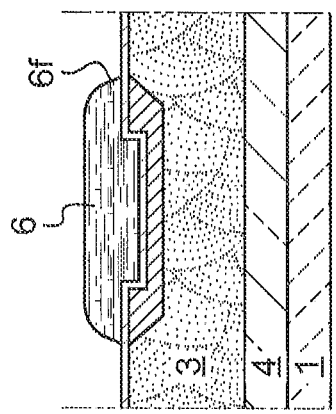
Figure 7H:
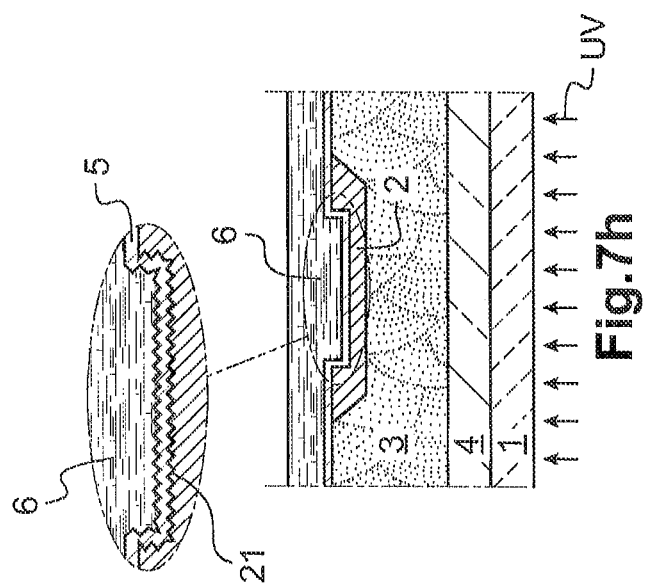

The eighth stage consists of:
the deposition of a layer 6a made of positive photosensitive material which, for example No. 1 is a photosensitive polyimide (Pimel™ polyimide series I-700), by spin coating, covering the electrically conducting coating 5, followed by a stage of annealing in a convective oven (100° C., 20 min),
exposure to ultraviolet radiation illustrated in FIG. 7h using a source of ultraviolet radiation which is, for example No. 1, a 20 mW/cm² (at 365 nm) mercury lamp on the side of the second main face 12.

The ninth stage, illustrated in FIG. 7i, consists of the result of the development of the positive photosensitive material in a solution based on tetramethylammonium hydroxide (TMAH) and a stage of rinsing with deionized water until the polyimide layer 6 has been rendered noncontinuous, leaving the nonexposed polyimide (nonexposed as a result of the screening by the silver strand) in the regions of the electrically conducting coating 5 located above the silver strands 20.

The passivation layer made of polyimide forming the localized insulating grid 6 has a thickness of the order of 300 nm.

A second annealing is subsequently carried out at 300° C. for 60 min, with or without dispensing with the first annealing. After this second annealing, the thickness of the passivation layer made of polyimide decreases from 380 to 300 nm.

The electrically conducting support according to the invention thus makes possible the manufacture of large-sized electrochromic devices (via the achievement of a low sheet resistance) with a better switching time, this being done without deterioration in the leakage currents, due to the passivation of the metal grid.

FIG. 1b illustrates a detailed diagrammatic view of a cross section of a cavity of the first partially structured layer with the strand of a grid deposited by PVD in a comparative example carried out by the applicant company, showing the top surface 34 and the anchored strand in a first structured layer (as in example 1).

The silver is deposited by magnetron cathode sputtering under argon at a pressure of $8 \times 10^{13}$ mbar with a silver target.

By an effect of shade due to the masking layer, the lateral regions 22"a and 22"b of the strand are dish-shaped. These dishes generate leakage currents.

The lateral regions 22"a and 22"b create breaks in morphology generating leakage currents.

FIG. 2 is a diagrammatic view in cross section of an electrically conducting support for an electrochromic device according to a second embodiment of the invention in which the first layer 3 is completely structured and the underlayer is dispensed with. The manufacturing conditions of example 1 are modified by the duration of etching of the first anchoring layer in order for $e_c$ to decrease from 350 nm to 400 nm.

FIG. 3 is a diagrammatic view in cross section of an electrically conducting support for an electrochromic device according to a third embodiment of the invention in which the passivation 6 is between the central region 21 and the electrically conducting coating 5.

FIG. 4 is a diagrammatic view in cross section of an electrically conducting support for an electrochromic device according to a fourth embodiment of the invention which differs from the first embodiment in that the central strand region is overflush with the top surface 34. The manufacturing conditions of example 1 are modified by the duration of etching of the first anchoring layer in order for $e_c$ to decrease from 350 nm to 250 nm.

FIG. 5 is a diagrammatic view in cross section of an electrically conducting support for an electrochromic device according to a fifth embodiment of the invention in which the grid is flush with the surface of the noncontinuous electrically conducting coating while being absent from the central region 21. The coating was deposited before the formation of the metal grid and of the passivation layer, it being possible for the discontinuity to be produced by wet etching.

FIG. 6 is a diagrammatic view in cross section of an electrically conducting support for an electrochromic device according to a sixth embodiment of the invention which differs from the first embodiment in that the grid 2, so deposited by autocatalytic deposition, such as silvering, is anchored in the first partially structured layer and also in a structured overlayer 3' on the first layer 3.

As the top surface of the electrically nonconducting domains between the silver strands is the surface of the overlayer 34', H is then defined between the surface of the central strand region 21 and the surface of the overlayer 34'.

The overlayer 3', made of electrically insulating material, preferably inorganic material, is noncontinuous structured defining traversing holes, with a thickness $e_z$ of 20 to 100 nm.

At the interface 34 (interface between the overlayer 3' and the first layer 3), the traversing holes are of width W1 with Wc>W1.

Strand regions referred to as edge regions 22a, 22'a are contiguous with the lateral regions 22, 22', are more peripheral than the lateral regions and are, in the cavities, under the overlayer and thus flush with the surface 34 of the first layer 3.

As shown in the detailed view in FIG. 6':
the lateral regions 22, 22' are of width L1 defined as the distance between points X" and Y',
the edge regions 22a, 22'a are of width L2 defined as the distance between points X' and Y,
L3 is the distance between X" and Y", Y" being the orthogonal projection of Y in the plane of the surface of the lateral regions 22, 22'.
L3 is greater than the total height $e_c+e'_c$ and $L3 \leq 2(e_c+e'_c)$, where $e_0$ is the height of the cavities and e' is the height of the holes of the overlayer 3.

In an example, the first layer is a layer of titanium oxide of 400 nm and the overlayer is a layer of silica with a thickness $e_z$ equal to 30 nm, for example deposited by PVD or the sol-gel process, or alternatively a silica layer which is as thin as possible. This can be a multilayer. Generally, $e_c$ is greater than $e'_c$ ($e_z$).

The invention claimed is:

1. An electrically conducting support for an electrochromic device, comprising:
a glass substrate, made of organic or inorganic glass, with a refractive index $n_1$ from 1.45 to 1.8, with a first main face forming a first surface,
an electrode, carried by the glass substrate and on a side of the first surface, which electrode comprises a layer arranged as a metal grid, made of metal material(s) exhibiting a sheet resistance of less than 10 Ω/□, with a thickness $e_2$ of at least 100 nm, the metal grid being formed of strands, the strands having a width A of less than or equal to 50 μm and being separated by a distance between strands B of less than or equal to 5000

μm and of at least 50 μm, the strands being separated by a plurality of electrically insulating electrically nonconducting domains having a top surface, the furthest from the substrate, and, on the side of the first surface, the electrically conducting support comprises a first layer of inorganic composition, the first layer being directly on the first surface or on an underlayer, the first layer being partially or completely structured in thickness with traversing holes or cavities, of width Wc, in order to at least partially anchor the metal grid, the top surface being the surface of the first layer or the surface of an overlayer, which is inorganic, on the first layer, wherein the strands exhibit, along their length, a central region between lateral regions which are flush with the top surface and a surface roughness of the central region is greater than a surface roughness of the lateral regions, wherein the support additionally comprises:

an electrically conducting coating made of inorganic substance which covers the top surface, is above the lateral regions and in electrical contact with the lateral regions, and optionally is present above the central regions and in electrical contact with the central regions, with a thickness $e_5$ of less than or equal to 500 nm, with a resistivity $\rho_5$ of less than 20 Ω.cm and greater than the resistivity of the metal grid, and which has a refractive index $n_5$ of at least 1.5, and wherein, in the central region, the middle of the strand surface and the top surface are separated by a vertical distance H taken at the normal to the first surface and which is less than or equal to 500 nm.

2. The electrically conducting support as claimed in claim 1, wherein a roughness parameter Rq of the lateral regions is at most 5 nm.

3. The electrically conducting support as claimed in claim 1, further comprising a noncontinuous passivation layer, made of electrically insulating material, forming a grid of insulating tracks located above the central regions and optionally above the lateral regions of the strands, not laterally going beyond external edges of the strands or laterally going beyond external edges of the strands by at most 1 μm.

4. The electrically conducting support as claimed in claim 3, wherein the passivation layer has, above the central region an upper surface, which exhibits a roughness parameter Rq of less than 10 nm.

5. The electrically conducting support as claimed in claim 3, wherein the passivation layer is a layer of oxide and/or of nitride of a material which is a metal and/or silicon.

6. The electrically conducting support as claimed claim 1, wherein the electrically conducting coating is noncontinuous, absent from the central regions and H is then defined between the middle of the strand surface and the surface of the electrically conducting coating.

7. The electrically conducting support as claimed in claim 3, wherein the electrically insulating material is a positive photosensitive material, with a thickness $e_6$ of less than 1000 nm, on the electrically conducting coating based on at least one of the following materials: polyimide, polysiloxane, phenol-formaldehyde or polymethyl methacrylate.

8. The electrically conducting support as claimed in claim 3, wherein the passivation layer is between the central region and the electrically conducting coating.

9. The electrically conducting support as claimed in claim 1, wherein the first layer is a layer of oxide and/or of nitride of a material which is a metal and/or silicon, or is also a layer of transparent conducting oxide.

10. The electrically conducting support as claimed in claim 1, wherein the central region is underflush with a top surface and H is greater than 100 nm.

11. The electrically conducting support as claimed in claim 1, wherein H is less than or equal to 100 nm.

12. The electrically conducting support as claimed in claim 1, wherein the metal grid is obtained by autocatalytic deposition.

13. The electrically conducting support as claimed in claim 1, wherein the metal grid exhibits a degree of covering T of less than 25%.

14. The electrically conducting support as claimed in claim 1, wherein the metal grids exhibits a nonregular pattern.

15. The electrically conducting support as claimed in claim 1, wherein the thickness $e_2$ of the metal grid is less than 1500 nm, and the width A is less than 30 μm.

16. The electrically conducting support as claimed in claim 1, wherein the material or materials of the metal grid are chosen from the group formed by silver, copper, nickel and the alloys based on these metals.

17. The electrically conducting support as claimed in claim 1, wherein the electrically conducting coating comprises an inorganic layer with a refractive index $n_a$ of between 1.7 and 2.3, with a thickness of less than 150 nm, made of transparent electrically conducting oxide.

18. The electrically conducting support as claimed in claim 1, wherein the first layer is completely structured in thickness with traversing holes of width Wc.

19. The electrically conducting support as claimed in claim 1, wherein the first layer is partially structured in thickness by being formed:

of a bottom region under the metal grid, of a structured region, which region forms the electrically nonconducting domains and has cavities of width Wc.

20. The electrically conducting support as claimed in claim 1, wherein the electrically nonconducting domains comprise:

the overlayer, made of electrically insulating material, which is noncontinuous, defines traversing holes, which overlayer forms part of the electrically nonconducting domains, the top surface being the surface of the overlayer, the first layer,
  completely structured in thickness, with traversing holes of width Wc at an interface between the overlayer and the first layer,
  or partially structured in thickness, being formed:
    of a bottom region under the metal grid,
    of a structured region, under the overlayer, a region with cavities facing the traversing holes, of width Wc at the interface between the overlayer and the first layer, at the interface between the overlayer and the first layer, the traversing holes of the overlayer being of width W1, when Wc>W1, strand regions referred to as edge regions are contiguous with the lateral regions, are more peripheral than the lateral regions and are in the cavities under the overlayer, when Wc>W1, the lateral regions are of width L1, defined as the distance between points X" and Y', the edge regions are of width L2, defined as the distance between points X' and Y, Y" is the orthogonal projection of Y in the plane of the surface of the lateral regions and L3 is the distance between X" and Y", L3 being greater than the total height $e_c+e'_c$ and $L3 \leq 2(e_c+e'_c)$, where $e_c$ is the height of the traversing holes or cavities of the first layer and $e'_c$ is the height of the holes.

21. An electrochromic device with a solid or liquid electrolyte incorporating an electrically conducting support as claimed in claim 1, the electrode with the metal grid forming a lower electrode, the closest to the first surface of the substrate, and/or, in the case of the liquid electrolyte, the device incorporating the electrically conducting support, the electrode with the metal grid forming the upper electrode.

22. A process for the manufacture of the electrically conducting support as claimed in claim 1, comprising, in this order:
   providing the substrate comprising, in this order:
      an optional underlayer on the first surface,
      a continuous "anchoring" layer, made of the composition of the first layer,
   forming cavities or traversing holes in the anchoring layer, thus forming the first layer structured in thickness, the surface of which is the top surface, which forming comprises:
      preparing, on the anchoring layer, of a noncontinuous masking layer made of photosensitive material with an arrangement of traversing openings, with side walls, by:
         deposition of the photosensitive material as an unbroken layer,
         exposure to ultraviolet radiation using a source of ultraviolet radiation on the first surface side,
      wet etching of the anchoring layer through the traversing openings of the masking layer, creating regions of the masking layer suspended above the cavities or traversing holes and thus defining portions of surfaces, referred to as internal surfaces, of the masking layer facing the cavities,
      forming the metal grid comprising deposition by the liquid route of a first metal material of the grid in the cavities or traversing holes, the first material being deposited on the side walls of the cavities or the traversing holes and completely on the internal surfaces of the masking layer, thus forming lateral strand regions which are flush with the top surface and less rough than the central strand regions,
      withdrawing the masking layer.

23. A process for the manufacture of the electrically conducting support as claimed in claim 1, the process comprising in this order:
   providing the substrate comprising:
      an optional underlayer on the first surface,
      a continuous "anchoring" layer, made of the composition of the first layer,
      on the anchoring layer, a continuous electrically insulating layer, referred to as additional layer, made of material of the overlayer,
   forming traversing holes in the additional layer, thus forming the overlayer completely or partially structured in thickness, which forming comprises:
      preparing on the additional layer a noncontinuous masking layer made of photosensitive material with an arrangement of traversing openings and with side walls, by
         deposition of the photosensitive material as an unbroken layer,
         exposure to ultraviolet radiation using a source of ultraviolet radiation on the side of the first surface,
      wet etching the additional layer, with a first etching solution, through the traversing openings of the masking layer, creating regions of the masking layer suspended above the traversing holes and thus defining portions of surfaces, referred to as internal surfaces, of the masking layer facing the traversing holes,
   forming the cavities or traversing holes in the anchoring layer (3a), thus forming the first partially structured layer with Wc>W1, which forming comprises:
      the wet etching of the anchoring layer with a second etching solution through the traversing openings of the masking layer and traversing holes of the overlayer, creating regions of the masking layer and of the overlayer suspended above the cavities or traversing holes of the first layer and thus defining portions of surfaces, referred to as other internal surfaces, of the overlayer facing the cavities or traversing holes of the first layer,
   forming the metal grid comprising deposition by the liquid route, of a first metal material of the grid in the cavities or traversing holes of the first layer and in the traversing holes of the overlayer, thus forming the lateral strand regions which are flush with the top surface under the internal surfaces while being less rough than the central strand regions, the first material being deposited on the side walls of the traversing holes of the overlayer, completely on the other internal surfaces of the overlayer and on the internal surfaces of the masking layer, thus forming the edge regions and the lateral strand regions,
   withdrawing the masking layer, in particular by the liquid route.

24. The process for the manufacture of the electrically conducting support as claimed in claim 22, wherein the deposition by the liquid route of the first metal material is a silvering.

25. The process for the manufacture of the electrically conducting support as claimed in claim 22, comprising a formation of a passivation layer as an insulating grid formed of insulating tracks on the central regions of the strands, wherein the formation comprises:
   the deposition as an unbroken layer of a positive photosensitive material of the passivation layer covering the electrically conducting coating,
   the exposure to ultraviolet radiation using a source of ultraviolet radiation on a side of a second main face of the substrate that is opposite the first main face,
   the development in solution until the layer of the positive photosensitive material has been rendered noncontinuous, the positive photosensitive material remaining located above the metal grid in order to form the passivation layer.

26. The process for the manufacture of the electrically conducting support as claimed in claim 22, comprising a formation of a passivation layer as an insulating grid formed of insulating tracks on the central regions of the strands, wherein the formation comprises:
   the deposition as an unbroken layer of a material of the passivation layer covering the electrically conducting coating,
   the preparation, on the unbroken layer, of another noncontinuous masking layer made of positive photosensitive material with a given arrangement of traversing openings, by:

deposition of a positive photosensitive material covering the unbroken layer of the material of the passivation layer, exposure to ultraviolet radiation using a source of ultraviolet radiation on a side of the second main face of the substrate that is opposite the first main face, development in solution until the exposed layer of the positive photosensitive material has been rendered noncontinuous, which layer is then located above the strands of the metal grid, the wet etching of the unbroken layer through the traversing openings of the other masking layer, creating the insulating tracks, the removal of the other masking layer by the liquid route.

27. The process for the manufacture of the electrically conducting support as claimed in claim 22, wherein, when H is at most 100 nm, the withdrawal of the masking layer following the formation of the metal grid creates protuberances with a height of at least 10 nm bordering the internal edges of the lateral regions of the metal grid and the process comprises, after the withdrawal of the masking layer and before the deposition of the electrically conducting coating, a stage of wet etching in order to eliminate the protuberances.

28. The electrically conducting support as claimed in claim 16, wherein the material or materials of the metal grid is based on silver.

29. The electrically conducting support as claimed in claim 18, wherein the underlayer is not structured.

30. The electrically conducting support as claimed in claim 19, wherein the lateral regions are contiguous with the first layer and have a width L1, L1 being greater than the height $e_e$ of the cavities and $L1 \leq 2e_c$.

31. The electrically conducting support as claimed in claim 20, wherein Wc>W1.

32. The process for the manufacture of the electrically conducting support as claimed in claim 22, wherein the first metal material is deposited by autocatalytic deposition.

33. The process for the manufacture of the electrically conducting support as claimed in claim 22, wherein the masking layer is withdrawn by liquid route.

34. The process for the manufacture of the electrically conducting support as claimed in claim 23, wherein the first metal material is deposited by autocatalytic deposition.

* * * * *